(12) United States Patent
Kim et al.

(10) Patent No.: US 10,962,826 B2
(45) Date of Patent: Mar. 30, 2021

(54) LIGHT CONTROLLING APPARATUS AND TRANSPARENT DISPLAY DEVICE COMPRISING THE SAME

(71) Applicant: LG Display Co., Ltd., Seoul (KR)

(72) Inventors: Jae-Hyun Kim, Paju-si (KR); Kihan Kim, Paju-si (KR); Choonghyo Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 14 days.

(21) Appl. No.: 16/427,217

(22) Filed: May 30, 2019

(65) Prior Publication Data
US 2019/0369423 A1 Dec. 5, 2019

(30) Foreign Application Priority Data
May 30, 2018 (KR) .......................... 10-2018-0061756

(51) Int. Cl.
| | |
|---|---|
| *G09G 3/36* | (2006.01) |
| *G02F 1/13357* | (2006.01) |
| *G02F 1/1347* | (2006.01) |
| *G09G 3/34* | (2006.01) |
| *H05B 47/10* | (2020.01) |

(52) U.S. Cl.
CPC ........ *G02F 1/1336* (2013.01); *G02F 1/13471* (2013.01); *G09G 3/3406* (2013.01); *G09G 3/3655* (2013.01); *G09G 3/3659* (2013.01); *H05B 47/10* (2020.01)

(58) Field of Classification Search
CPC .......... G09G 3/3406; G09G 3/34; G09G 3/36; G09G 3/3655; G09G 3/3659
See application file for complete search history.

(56) References Cited

U.S. PATENT DOCUMENTS

| | | | | |
|---|---|---|---|---|
| 10,620,749 | B2* | 4/2020 | Lee | G06F 3/04166 |
| 2010/0259563 | A1* | 10/2010 | Tokuda | G09G 3/3258 |
| | | | | 345/690 |
| 2017/0168650 | A1* | 6/2017 | Lee | G02F 1/13439 |

* cited by examiner

*Primary Examiner* — Vijay Shankar
(74) *Attorney, Agent, or Firm* — Birch, Stewart, Kolasch & Birch, LLP

(57) ABSTRACT

A light controlling apparatus and a transparent display device comprising the same are discussed, in which picture quality can be prevented from being deteriorated by a voltage drop. The light controlling apparatus can include a first base film including a first lower pad arranged at a first side edge on one surface and a second lower pad arranged at a second side edge on the one surface; a second base film including a first upper pad arranged at a third side edge on one surface facing one surface of the first base film and a second upper pad arranged at a fourth side edge on the one surface; and a flexible circuit board including driving voltage lines electrically connected with the first and second lower pads and common voltage lines electrically connected with the first and second upper pads.

23 Claims, 14 Drawing Sheets

LIGHT CONTROLLING APPARATUS AND TRANSPARENT DISPLAY DEVICE COMPRISING THE SAME

CROSS REFERENCE TO RELATED APPLICATION

The present application claims the priority benefit of Korean Patent Application No. 10-2018-0061756 filed in Republic of Korea on May 30, 2018, which is hereby incorporated by reference in its entirety for all purposes as if fully set forth herein.

BACKGROUND OF THE DISCLOSURE

Technical Field

The present disclosure relates to a light controlling apparatus and a transparent display device comprising the same.

Description of the Related Art

Recently, with the advancement of the information age, display devices for processing and displaying a large amount of information have been promptly developed. More particularly, various display devices have been introduced and spotlighted.

Detailed examples of the display devices include liquid crystal display (LCD) devices, plasma display panel (PDP) devices, field emission display (FED) devices, electroluminescence display (ELD) devices, and organic light emitting diodes (OLED). The display devices have excellent properties of a thin profile, light weight and low power consumption and thus their application fields have been increased continuously. In particular, in most of electron devices or mobile devices, the display device has been used as one of user interfaces.

Further, studies of a transparent display device through which a user may see objects or images disposed on a rear surface of the display device have been actively made in recent years.

The transparent display device may be designed to allow external light to transmit such that a user may see objects or background disposed on a rear surface of the display device. For this reason, problems occurs in that a bright-room contrast ratio and luminance are deteriorated. Therefore, a light controlling apparatus for preventing a bright-room contrast ratio and luminance from being deteriorated when a transparent display device displays information is required.

BRIEF SUMMARY OF THE DISCLOSURE

The present disclosure has been made to address the above problems and limitations associated with the related art devices.

It is an object of the present disclosure to provide a light controlling apparatus and a transparent display device comprising the same, in which a uniform voltage can be supplied to the light controlling apparatus to prevent picture quality from being deteriorated by a voltage drop.

In accordance with an aspect of the present disclosure, the above and other objects can be accomplished by the provision of a light controlling apparatus comprising a first base film including a first lower pad arranged at a first side edge on one surface and a second lower pad arranged at a second side edge on the one surface; a second base film including a first upper pad arranged at a third side edge on one surface facing one surface of the first base film and a second upper pad arranged at a fourth side edge on the one surface; and a flexible circuit board including driving voltage lines electrically connected with the first and second lower pads and common voltage lines electrically connected with the first and second upper pads.

In the light controlling apparatus according to the embodiment(s) of the present disclosure, the flexible circuit board can be attached to at least three sides of the first and second base films to prevent a voltage drop from occurring at a longer distance from the flexible circuit board, whereby non-uniform characteristics can be prevented from occurring.

Further, in the light controlling apparatus according to the embodiment(s) of the present disclosure, since the flexible circuit board is attached to a sealant area provided with a pad, picture quality can be prevented from being deteriorated without needing additional space.

In addition to the effects of the present disclosure as mentioned above, additional advantages and features of the present disclosure will be clearly understood by those skilled in the art from the above description of the present disclosure.

DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" can include all combinations of two or more elements selected from the first, second and third elements as well as each element of the first, second and third elements. Also, if it is mentioned that a first element is positioned "on" or "above" a second element, it should be understood that the first and second elements can be brought into contact with each other, or a third element or additional elements can be interposed between the first and second elements.

Hereinafter, a light controlling apparatus and a transparent display device comprising the same according to the present disclosure will be described in detail with reference to the accompanying drawings. Wherever possible, the same reference numbers will be used throughout the drawings to refer to the same or like parts. Also, in the following description of the present disclosure, if detailed description of elements or functions known in respect of the present disclosure is determined to make the subject matter of the present disclosure unnecessarily obscure, the detailed description will be omitted or may be brief.

Hereinafter, the preferred embodiments of the present disclosure will be described in detail with reference to the accompanying drawings.

Figure 1:
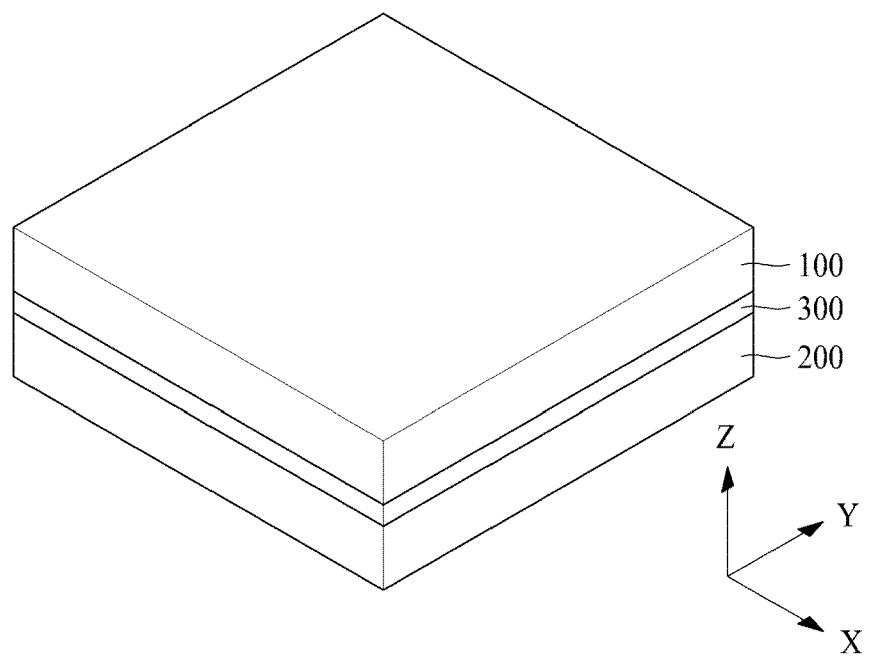
FIG. 1 is a perspective view illustrating a transparent display device according to an embodiment of the present disclosure.
Figure 2:
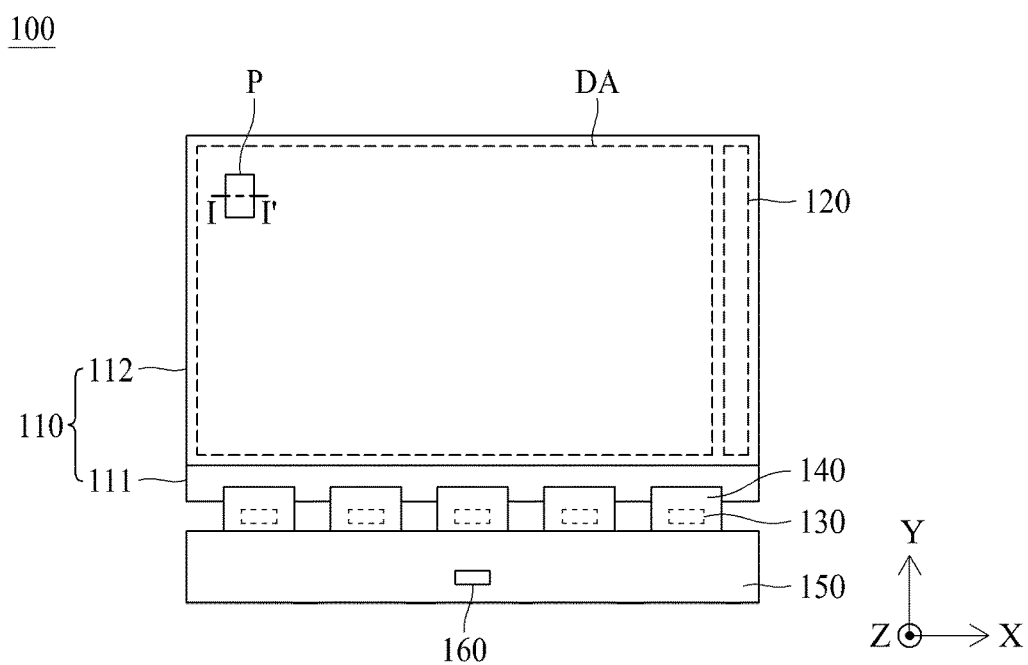
FIG. 2 is a plane view illustrating a transparent display panel of the transparent display device according to the embodiment of the present disclosure.
Figure 3:
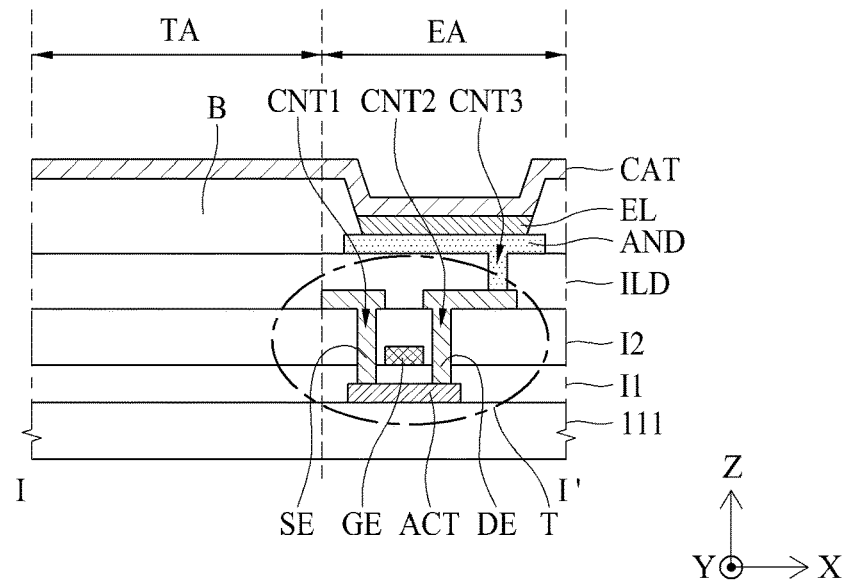
FIG. 3 is a cross-sectional view along line I-I' of FIG. 2.

FIG. 1 is a perspective view illustrating a transparent display device according to an embodiment of the present disclosure. FIG. 2 is a plane view illustrating a transparent display panel of the transparent display device according to the embodiment of the present disclosure. FIG. 3 is a cross-sectional view along line I-I' of FIG. 2. All components of the transparent display devices according to all embodiments of the present disclosure are operatively coupled and configured.

Hereinafter, the transparent display device according to the embodiment of the present disclosure will be described in detail with reference to FIGS. 1 to 3. In the example of FIGS. 1 to 3, an X-axis direction denotes a direction parallel with a gate line, a Y-axis direction denotes a direction parallel with a data line, and a Z-axis direction denotes a height direction of the transparent display device. However, other variations are possible and these directions can be defined differently.

Referring to FIGS. 1 to 3, the transparent display device according to the embodiment of the present disclosure includes a transparent display panel 100, a light controlling apparatus 200, and an adhesive layer 300.

Although the transparent display device according to the embodiment of the present disclosure is described to be implemented as an organic light emitting display device, the transparent display device can be implemented as a liquid crystal display device, a quantum dot light emitting display (QLED) device, an electrophoresis display device, or other types of display device.

The transparent display panel 100 can include a display substrate 110, a gate driver 120, a source drive integrated circuit (hereinafter, referred to as "IC") 130, a flexible film 140, a circuit board 150, and a timing controller 160.

The display substrate 110 includes a lower substrate 111 and an upper substrate 112. The upper substrate 111 can be an encapsulation substrate. The lower substrate 111 is formed to be greater than the upper substrate 112 (e.g., in size), whereby the lower substrate 111 can partially be exposed without being covered by the upper substrate 112.

Gate lines and data lines can be formed on a display area DA of the display substrate 110, and light emitting portions can be formed on areas where the gate lines cross the data lines. The light emitting portions of the display area DA can display an image.

The display area DA includes transmissive areas TA and emission areas EA as shown in FIG. 3. The transparent display panel 100 can allow a user to view an object or background arranged on a rear surface of the transparent display panel 100 due to the transmissive areas TA, and can display images due to the emission areas EA.

The transmissive area TA is an area for passing through almost all of incident light as it is (e.g., passing all or most of the incident light as it is). The emission area EA is an area for emitting light. The emission area EA can include a plurality of pixels P. Each of the pixels P can include a red emission portion, a green emission portion, and a blue emission portion, and can further include a white emission portion as a variation. Alternatively, each of the pixels P can include at least two or more of the red emission portion, the green emission portion, the blue emission portion, a yellow emission portion, a magenta emission portion, and a cyan emission portion, or a variation thereof. The red emission portion is an area for emitting red light, the green emission portion is an area for emitting green light, and the blue emission portion is an area for emitting blue light. Each of the red emission portion, the green emission portion and the blue emission portion of the emission area EA emits predetermined light and corresponds to a non-transmissive area that does not transmit incident light.

Each of the red emission portion, the green emission portion and the blue emission portion can be provided with a transistor T, an anode electrode AND, an organic layer EL, and a cathode electrode CAT as shown in FIG. 3.

The transistor T includes an active layer ACT provided on the lower substrate 111, a first insulating film I1 provided on the active layer ACT, a gate electrode GE provided on the first insulating film I1, a second insulating film I2 provided on the gate electrode GE, and source and drain electrodes SE and DE provided on the second insulating film I2 and connected to the active layer ACT through first and second contact holes CNT1 and CNT2. The transistor T is formed, but not limited to, as a top gate type in which the gate electrode GE is arranged on the active layer ACT in FIG. 3. For example, the transistor T can be formed as a bottom gate type in which the gate electrode GE is arranged below the active layer ACT.

The anode electrode AND is connected to the drain electrode DE of the transistor T through a third contact hole CNT3 passing through an inter layer dielectric (ILD) film provided on the source electrode SE and the drain electrode DE. A bank B is provided between anode electrodes AND adjacent to each other, whereby the anode electrodes AND adjacent to each other can electrically be insulated from each other.

The organic layer EL is provided on the anode electrode AND. The organic layer EL can include a hole transporting layer, an organic light emitting layer, and an electron transporting layer. The cathode electrode CAT is provided on the organic layer EL and the bank B. If a voltage is applied to the anode electrode AND and the cathode electrode CAT, holes and electrons move to the organic layer EL through the hole transporting layer and the electron transporting layer, respectively, and are combined with each other in the organic layer EL to emit light.

Although the transparent display panel 100 is implemented as a top emission type in FIG. 3, the transparent display panel 100 can be implemented as a bottom emission type without limitation to the example of FIG. 3. In the top emission type, light of the organic layer EL is emitted toward the upper substrate, whereby the transistor T can be provided widely below the bank B and the anode electrode AND. Therefore, the top emission type has an advantage in that a design area of the transistor T is wider than that of the bottom emission type. In the top emission type, it is preferable that the anode electrode AND is formed of a metal material having high reflectivity such as Al and a deposition structure of Al and ITO, and the cathode electrode CAT is formed of a transparent metal material such as ITO and IZO.

As described above, each of the pixels P of the transparent display device according to the embodiment of the present disclosure includes a transmissive area TA transmitting all or almost all of incident light as it is, and an emission area EA emitting light. As a result, according to the embodiment of the present disclosure, the user can view an object or background arranged on the rear surface of the transparent display device through the transmissive areas TA of the transparent display device.

The gate driver 120 supplies gate signals to the gate lines in accordance with a gate control signal input from the timing controller 160. The gate driver 120 can be formed in, but not limited to, a gate driver in panel (GIP) type outside one side of the display area DA of the display substrate 110. For example, the gate driver 120 can be formed in a GIP type outside both sides of the display area DA of the display substrate 110. Alternatively, the gate driver 120 can be fabricated of a driving chip, packaged in a flexible film and attached to the display substrate 110 in a tape automated bonding (TAB) type.

The source drive IC 130 receives digital video data and a source control signal from the timing controller 160. The source drive IC 130 converts the digital video data to analog data voltages in accordance with the source control signal and supplies the analog data voltages to the data lines. If the source drive IC 130 is fabricated of a driving chip, the source drive IC 130 can be packaged in the flexible film 140 as a chip on film (COF) or chip on plastic (COP) type.

Since the lower substrate 111 is greater than the upper substrate 112, the lower substrate 111 can partially be exposed without being covered by the upper substrate 112. Pads such as data pads can be provided in the part of the lower substrate 11 which is exposed without being covered by the upper substrate 112. Lines which connect the pads with the source drive IC 130 and lines which connect the pads with lines of the circuit board 150 can be formed in the flexible film 140. The flexible film 140 is attached onto the pads by using an anisotropic conducting film, whereby the pads can be connected with the lines of the flexible film 140.

The circuit board 150 can be attached to the flexible films 140. A plurality of circuits comprised of driving chips can be packaged in the circuit board 150. For example, the timing controller 160 can be packaged in the circuit board 150. The circuit board 150 can be a printed circuit board or a flexible printed circuit board.

The timing controller 160 receives digital video data and a timing signal from an external system board. The timing controller 160 generates a gate control signal for controlling an operation timing of the gate driver and a source control signal for controlling the source drive ICs 130 on the basis of the timing signal. The timing controller 160 supplies the gate control signal to the gate driver 120, and supplies the source control signal to the source drive ICs 130.

Since the transmission areas TA exist in the transparent display panel 100 to allow the user to view objects or background arranged on the rear surface of the display panel 100, a problem occurs in that a bright-room contrast ratio can be deteriorated. Therefore, the light controlling apparatus 200 which can implement a light-shielding mode for shielding light to prevent a bright-room contrast ratio from being deteriorated when the transparent display panel 100 displays information is required and provided according to the embodiments of the present disclosure.

The light controlling apparatus 200 can shield incident light in a light-shielding mode, and can transmit incident light in a transmissive mode. In the transparent display device according to the embodiment of the present disclosure, the light controlling apparatus 200 is applied to the transparent display panel 100, whereby a bright-room contrast ratio and luminance can be prevented from being deteriorated. A detailed description of the light controlling apparatus according to the embodiments of the present disclosure will be described in more detail later with reference to FIGS. 4 to 23.

The adhesive layer 300 adheres the transparent display panel 100 to the light controlling apparatus 200. The adhesive layer 300 can be a transparent adhesive film such as an optically clear adhesive (OCA), or a transparent adhesive such as an optically clear resin (OCR). In this case, the adhesive layer 300 can have, but is not limited to, a refractive index between 1.4 and 1.9 for refractive index matching between the transparent display panel 100 and the light controlling apparatus 200.

Hereinafter, the light controlling apparatus 200 according to a first embodiment of the present disclosure will be described with reference to FIGS. 4 to 11.

First Embodiment

Figure 4:
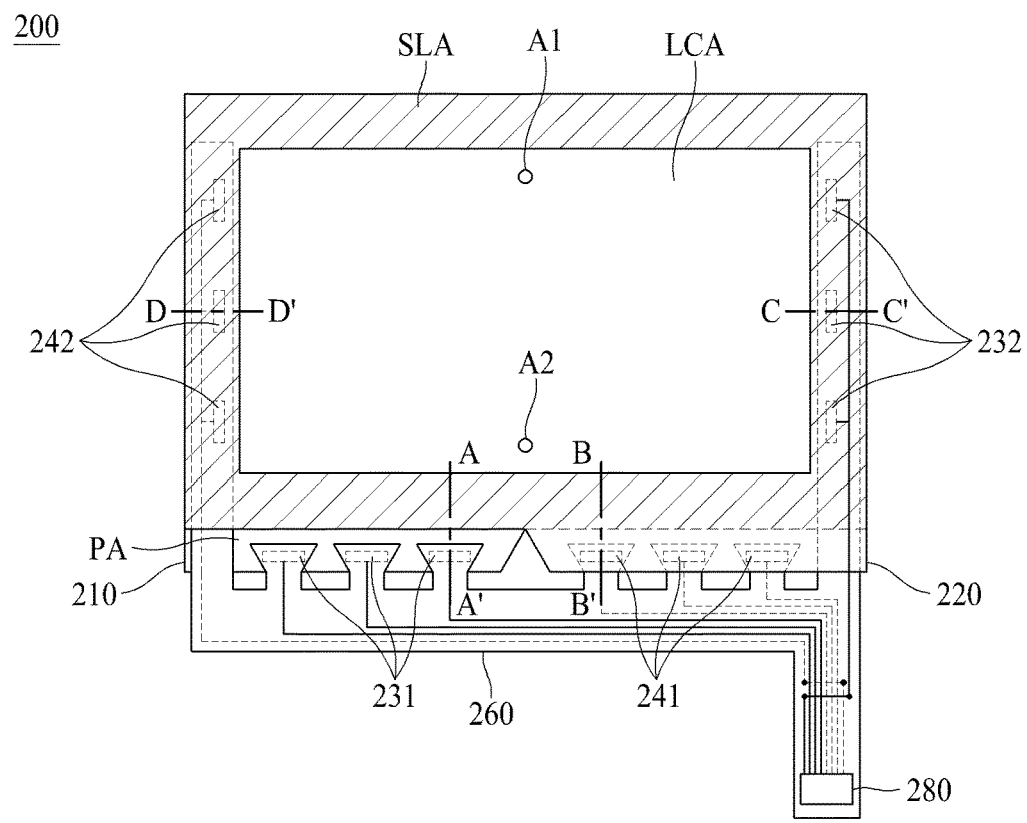
FIG. 4 is a plane view illustrating a light controlling apparatus according to a first embodiment of the present disclosure.
Figure 5:
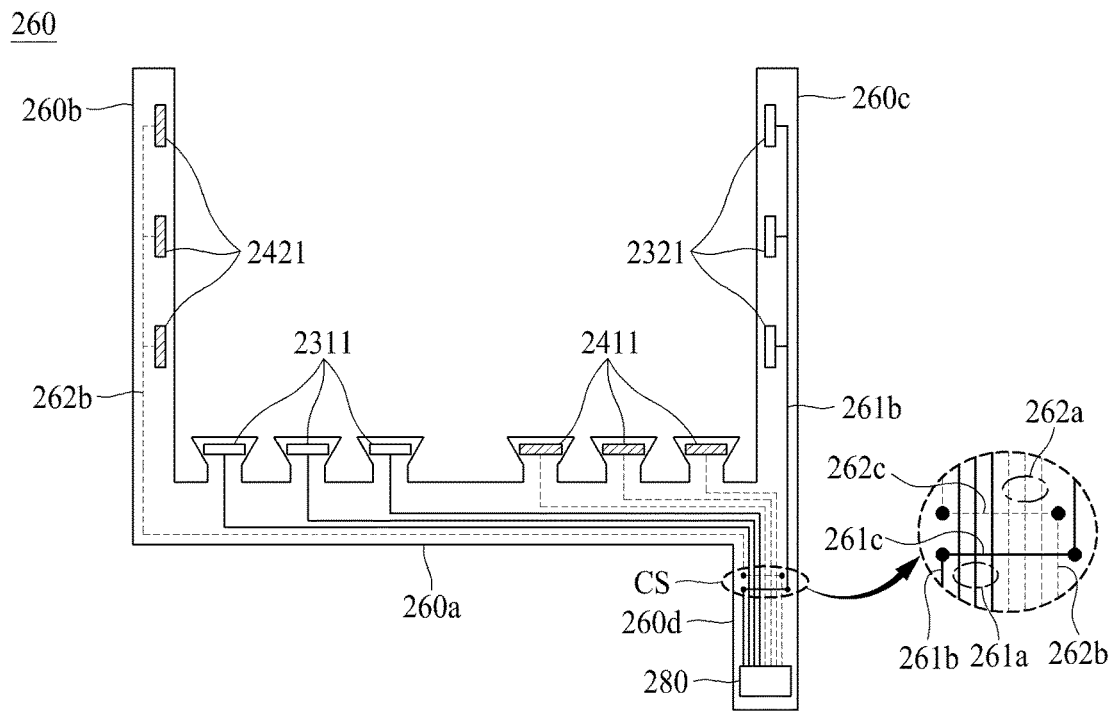
FIG. 5 is a plane view illustrating a flexible circuit board according to the first embodiment of the present disclosure.
Figure 6:
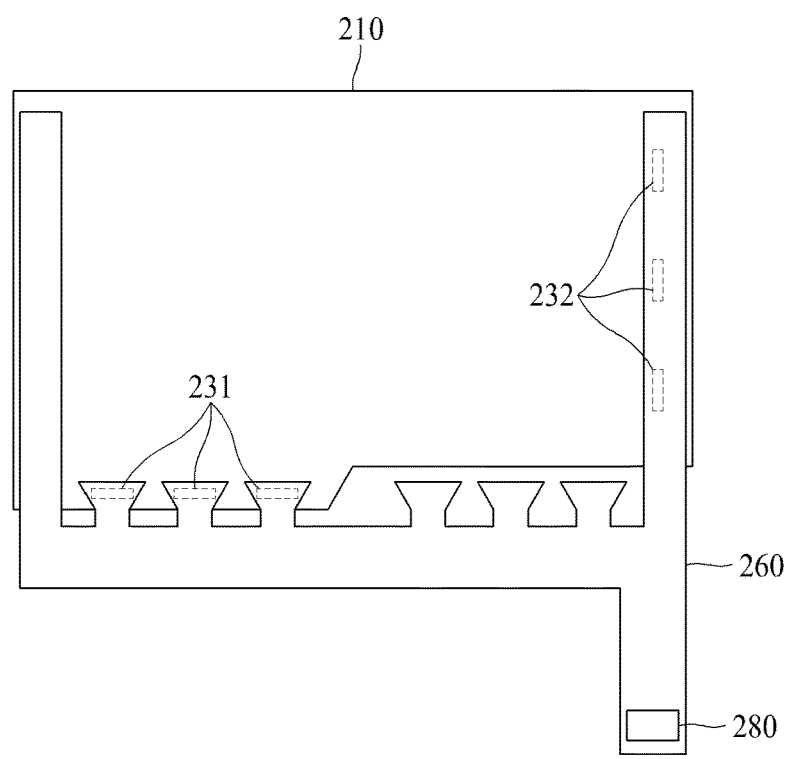
FIG. 6 is a plane view briefly illustrating a first base film and the flexible circuit board of the light controlling apparatus according to the first embodiment of the present disclosure.
Figure 7:
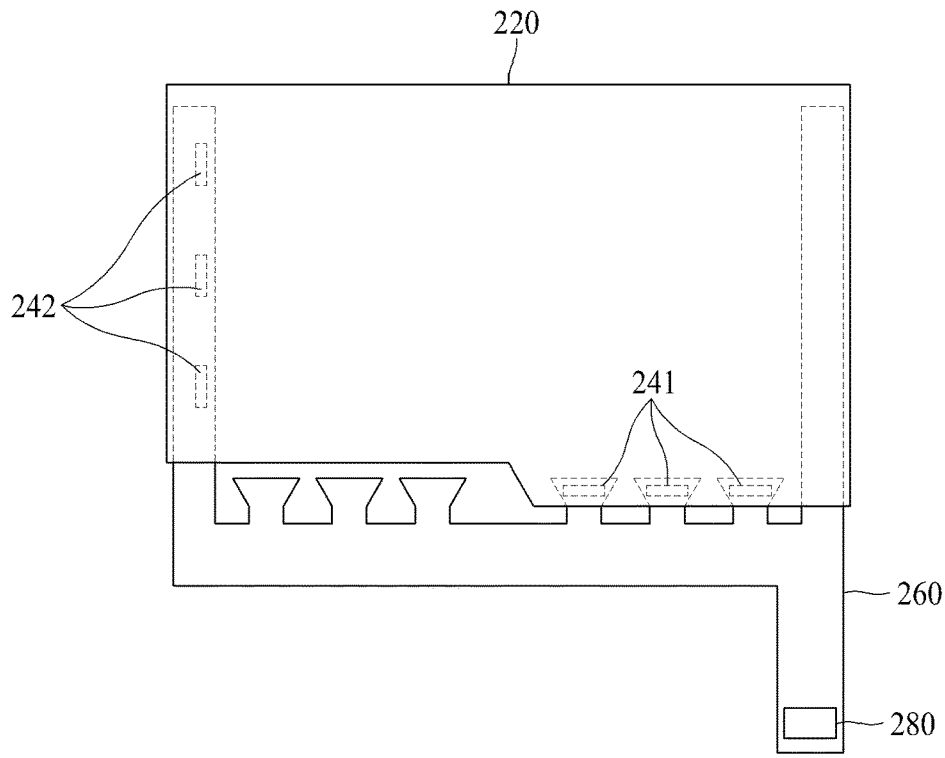
FIG. 7 is a plane view briefly illustrating a second base film and the flexible circuit board of the light controlling apparatus according to the first embodiment of the present disclosure.
Figure 8:
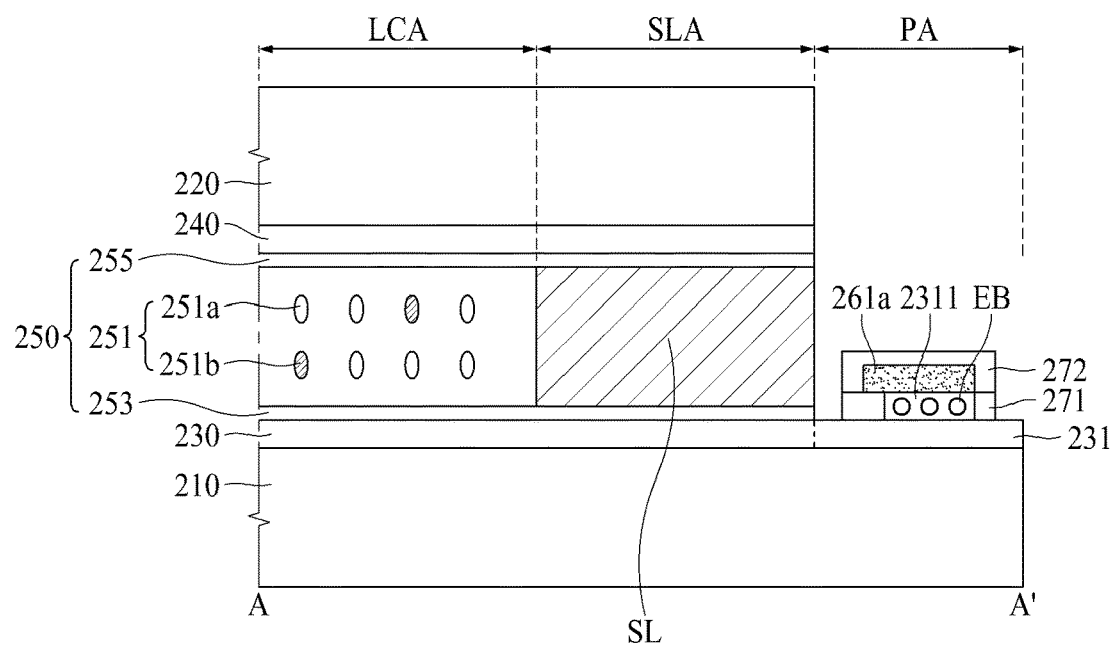
FIG. 8 is a cross-sectional view along line A-A' of FIG. 4.
Figure 9:
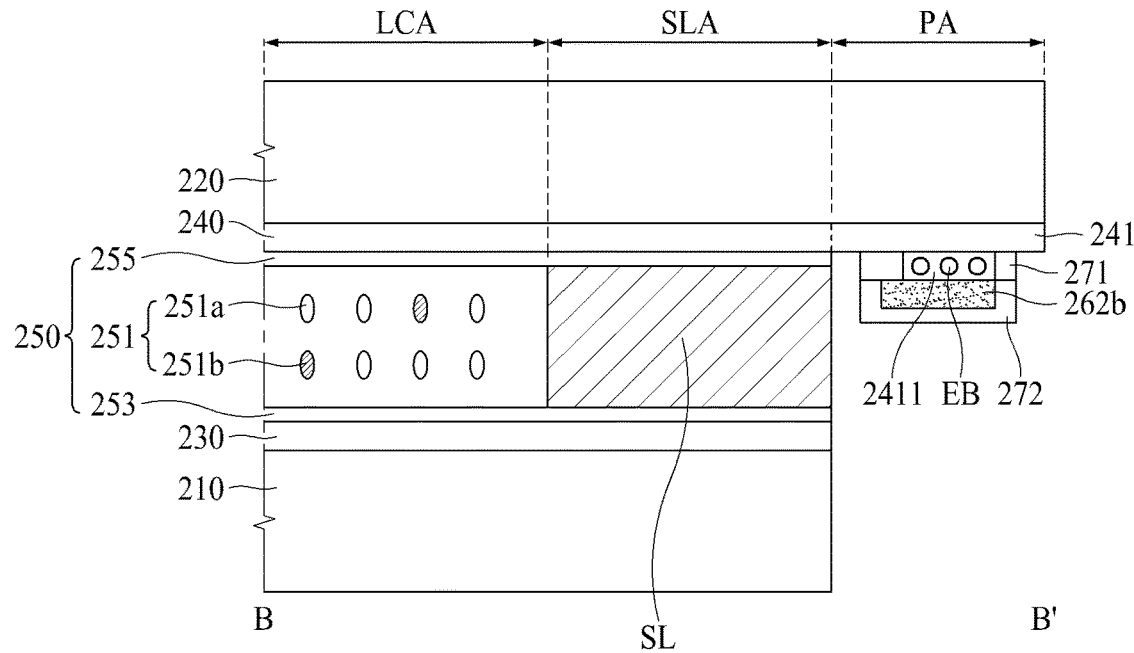
FIG. 9 is a cross-sectional view along line B-B' of FIG. 4.
Figure 10:
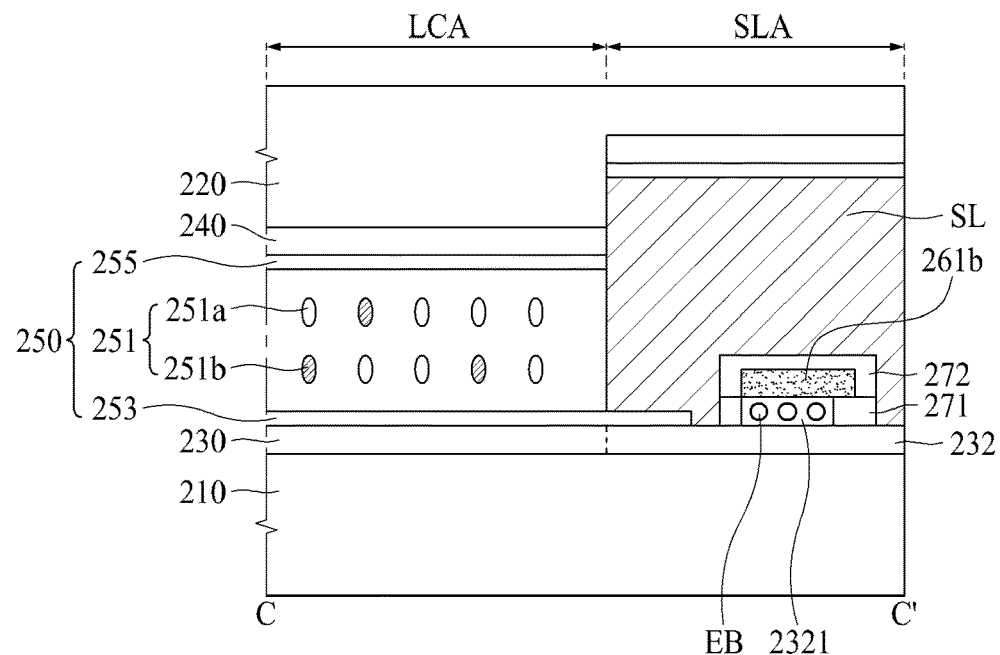
FIG. 10 is a cross-sectional view along line C-C' of FIG. 4.
Figure 11:
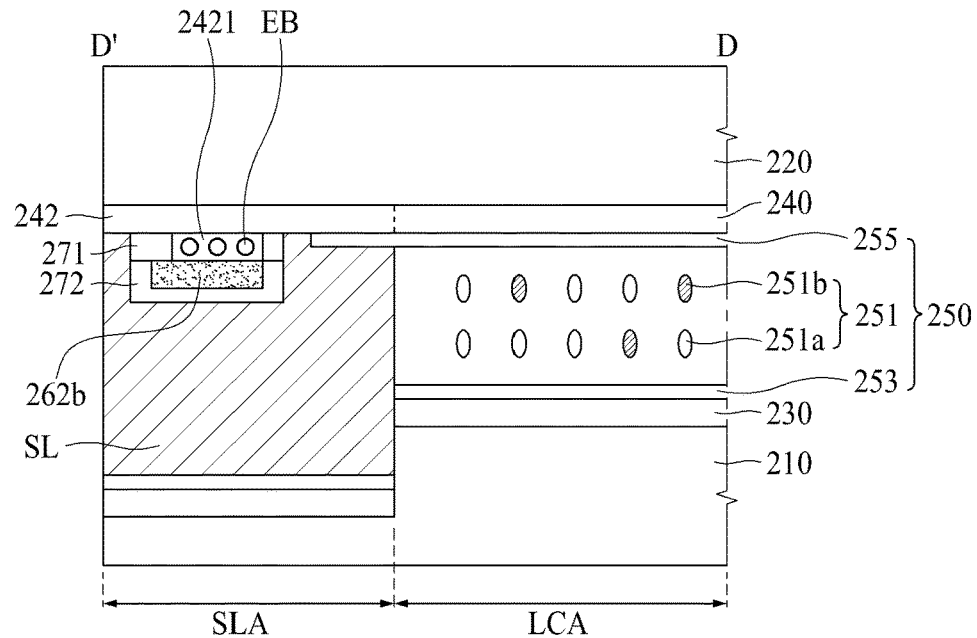
FIG. 11 is a cross-sectional view along line D-D' of FIG. 4.

FIG. 4 is a plane view illustrating a light controlling apparatus according to the first embodiment of the present disclosure. FIG. 5 is a plane view illustrating a flexible circuit board according to the first embodiment of the present disclosure. FIG. 6 is a plane view briefly illustrating a first base film and the flexible circuit board of the light controlling apparatus according to the first embodiment of the present disclosure. FIG. 7 is a plane view briefly illustrating a second base film and the flexible circuit board of the light controlling apparatus according to the first embodiment of the present disclosure. FIG. 8 is a cross-sectional view along line A-A' of FIG. 4, FIG. 9 is a cross-sectional view along line B-B' of FIG. 4, FIG. 10 is a cross-sectional view along line C-C' of FIG. 4, and FIG. 11 is a cross-sectional view along line D-D' of FIG. 4.

The light controlling apparatus 200 can shield incident light in a light-shielding mode, and can transmit incident light in a transmissive mode. Hereinafter, the light controlling apparatus 200 according to the first embodiment of the present disclosure will be described with reference to FIGS. 4 to 11.

Referring to FIGS. 4 to 11, the light controlling apparatus 200 according to the first embodiment of the present disclosure includes a light controlling area LCA, a sealant area SLA, and a pad area PA.

The light controlling area LCA is arranged inside the sealant area SLA. The light controlling area LCA can be provided at a position corresponding to the display area DA of FIG. 2. The light controlling area LCA according to one embodiment of the present disclosure includes a first electrode 230, a second electrode 240 and a liquid crystal layer 250, which are arranged between a first base film 210 and a second base film 220.

The first base film 210 and the second base film 220 are arranged to face each other. Each of the first base film 210 and the second base film 220 can be a plastic film. For example, each of the first base film 210 and the second base film 220 can be, but is not limited to, a sheet or film that includes cellulose resin such as TAC(triacetyl cellulose) or DAC(diacetyl cellulose), COP(cyclic olefin polymer) such as norbornene derivatives, COC(cyclo olefin copolymer), acryl resin such as PMMA(poly(methylmethacrylate)), polyolefin such as PC(polycarbonate), PE(polyethylene) or PP(polypropylene), polyester such as PVA(polyvinyl alcohol), PES(poly ether sulfone), PEEK(polyetheretherketone), PEI(polyetherimide), PEN(polyethylenenaphthalate), and PET(polyethyleneterephthalate), PI(polyimide), PSF(polysulfone), or fluoride resin.

The first electrode 230 is arranged on the first base film 210 to face the second base film 220. The second electrode 240 is provided on one surface of the second base film 220 which faces the first base film 210. Each of the first and second electrodes 230 and 240 can be a transparent electrode. For example, each of the first and second electrodes 230 and 240 can be, but is not limited to, silver oxide (e.g., AgO or Ag2O or Ag2O3), aluminum oxide (e.g., Al2O3), tungsten oxide (e.g., WO2 or WO3 or W2O3), magnesium oxide (e.g., MgO), molybdenum oxide (e.g., MoO3), zinc oxide (e.g., ZnO), tin oxide (e.g., SnO2), indium oxide (e.g., In2O3), chrome oxide (e.g., CrO3 or Cr2O3), antimony oxide (e.g., Sb2O3 or Sb2O5), titanium oxide (e.g., TiO2), nickel oxide (e.g., NiO), copper oxide (e.g., CuO or Cu2O), vanadium oxide (e.g., V2O3 or V2O5), cobalt oxide (e.g., CoO), iron oxide (e.g., Fe2O3 or Fe3O4), niobium oxide (e.g., Nb2O5), Indium Tin Oxide (ITO), Indium Zinc Oxide (IZO), Aluminum doped Zinc Oxide (ZAO), Aluminum Tin Oxide (TAO) or Antimony Tin Oxide (ATO).

The liquid crystal layer 250 can be a dynamic scattering mode liquid crystal layer that includes liquid crystals, dichroic dyes and ion materials. In case of a dynamic scattering mode, if a voltage is applied to the first and second electrodes 230 and 240, the ion materials allow the liquid crystals and the dichroic dyes to randomly move. In this case, the light entering the liquid crystal layer 250 can be scattered by the liquid crystals which move randomly, or can be absorbed by the dichroic dyes, whereby the light-shielding mode can be implemented.

In another example, the liquid crystal layer 250 can be a guest host liquid crystal layer that includes liquid crystals and dichroic dyes. In this case, the liquid crystals can be host materials and the dichroic dyes can be guest materials.

In another example, the liquid crystal layer 250 can be a polymer network liquid crystal layer that includes liquid crystals, dichroic dyes and a polymer network. In this case, the liquid crystal layer 250 can enhance a scattering effect of incident light due to the polymer network. If the liquid crystal layer 250 includes a polymer network, a light-shielding rate can be more enhanced than the case that the light-shielding mode is implemented in a state that the liquid crystal layer 250 does not include a polymer network. For convenience of description, the liquid crystal layer 250 is implemented as a guest host liquid crystal layer in FIGS. 8 to 11.

In detail, referring to FIGS. 8 to 11, the liquid crystal layer 250 according to one embodiment of the present disclosure can include liquid crystal cells 251, barriers, a first alignment film 253 and a second alignment film 254.

The liquid crystal cells 251 include a plurality of liquid crystals 251a and a plurality of dichroic dyes 251b, which are arranged between the first base film 210 and the second base film 220 and between barriers.

The liquid crystals 251a can be positive liquid crystals arranged in a vertical direction (Z-axis direction) if a voltage is applied to the first and second electrodes 230 and 240. Likewise, the dichroic dyes 251b can also be arranged in a vertical direction (Z-axis direction) if a voltage is applied between the first and second electrodes 230 and 240.

The dichroic dyes 251b can be dyes that absorb light. For example, the dichroic dyes 251b can be black dyes that absorb every light of a visible ray wavelength range or dyes that absorb light except a specific colored (for example, red) wavelength range and reflect light of the specific colored (for example, red) wavelength range. For example, the dichroic dyes 251b can be dyes that have any one color of red, green, blue and yellow or have a mixed color of red, green, blue and yellow. That is, in the embodiment of the present disclosure, various colors can be displayed in the light-shielding mode and at the same time background can be shielded. For this reason, in the embodiment of the present disclosure, since various colors can be provided in the light-shielding mode, a user can feel an esthetic effect. For example, the transparent display device according to the embodiment of the present disclosure can be used for a public place, and if the transparent display device is applied to a smart window or public window, which requires a transmissive mode and a light-shielding mode, the transparent display device can shield light while displaying various colors in accordance with time, place, or other factors.

The barriers can be arranged between the first base film 210 and the second base film 220, or can be omitted. The barriers can be provided, but are not limited to, vertically from the first base film 210. The barriers are arranged between the liquid crystal cells 251 to maintain a cell gap of the liquid crystal cells 251. Ratios of the liquid crystals 251a to the dichroic dyes 251b per liquid crystal cell 251 can be maintained almost similarly or equally due to the barriers.

The barriers can be formed of a transparent material. In this case, the barriers can be formed of, but are not limited to, any one of a photo resist, a photo-hardening polymer, and polydimethysiloxane. The barriers can be arranged in, but are not limited to, a stripe pattern. The barriers can be arranged in a honeycomb pattern or p-angulated shape pattern (p is a positive integer of 3 or more).

The barriers can be arranged to correspond to each of the emission areas EA of the transparent display panel 100 but are not limited to this case.

The first alignment film 253 is arranged on the first base film 210. The first alignment film 253 is formed on the first electrode 230 which faces the second base film 220.

The second alignment film 254 is provided on one surface of the second electrode 240 which faces the first base film 210. The first and second alignment films 253 and 254 can be vertical alignment films for arranging a long-axis direction of the liquid crystals 251a and the dichroic dyes 251d in a vertical direction (Z-axis direction) if no voltage is applied to each of the first and second electrodes 230 and 240. The first and second alignment films 253 and 254 can be polyimide (PI).

Since the light controlling apparatus 200 according to one embodiment of the present disclosure can implement a light-shielding mode which shields light by means of the light controlling area LCA, a bright-room contrast ratio of the transparent display device can be prevented from being deteriorated when the light controlling apparatus 200 is applied to the transparent display panel 100.

The sealant area SLA is arranged to surround the light controlling area LCA. The sealant area SLA according to one example can have a frame shape. The sealant area SLA according to one embodiment of the present disclosure bonds the first base film 210 to the second base film 220 by means an adhesive material SL such as a sealant, which is arranged between the first base film 210 and the second base film 220. Also, the sealant area SLA according to one embodiment of the present disclosure includes a first electrode 230 extended from the light controlling area LCA, a second lower pad 232, a second electrode 240, and a second upper pad 242. The sealant area SLA according to one example can include, but is not limited to, a first alignment film 253 and a second alignment film 254 as shown in FIGS. 8 to 11.

The pad area PA is arranged outside the sealant area SLA. The pad area PA can be provided on a portion where a part of an edge of each of the first base film 210 and the second base film 220 is extended and then protruded. The pad area PA according to one embodiment of the present disclosure includes a first lower pad 231 and a first upper pad 241.

In the light controlling apparatus 200 according to one embodiment of the present disclosure, pads are arranged on the sealant area SLA and the pad area PA, and a flexible circuit board 260 is attached to the sealant area SLA and the pad area PA. In the light controlling apparatus of the related art, since a flexible circuit board is attached to a pad area only provided at one side of a base film to supply a voltage, a problem occurs in that a voltage drop is caused by resistance if the flexible circuit board becomes far away from the pad area. To solve this problem, in the light controlling apparatus 200 according to one embodiment of the present disclosure, the pads are provided at several sides of the base film. Therefore, the pad area PA according to one embodiment of the present disclosure can partially be overlapped with the sealant area SLA as shown in FIG. 4.

In the light controlling apparatus 200 according to one embodiment of the present disclosure, the flexible circuit board 260 can be attached to at least three sides of the first and second base films 210 and 220 to prevent a voltage drop, whereby non-uniform characteristics can be prevented from occurring. Also, in the light controlling apparatus 200 according to one embodiment of the present disclosure, since the pad is provided on the sealant area SLA and the flexible circuit board 260 is attached to the pad, picture quality can be prevented from being deteriorated without using additional space.

Hereinafter, the first base film 210, the second base film 220 and the flexible circuit board 260 of the light controlling apparatus 200 according to one embodiment of the present disclosure will be described in detail.

FIG. 6 is a plane view briefly illustrating that pads 231 and 232 provided in the first base film 210 are attached with the flexible circuit board 260, and FIG. 7 is a plane view briefly illustrating that pads 241 and 242 provided in the second base film 220 are attached with the flexible circuit board 260.

Referring to FIG. 6, the first base film 210 includes a first lower pad 231 arranged at a first side edge on one surface, and a second lower pad 232 arranged at a second side edge on one surface. At this time, the flexible circuit board 260 according to one example is arranged above the first base film 210. In order that the first base film 210 is electrically connected with the flexible circuit board 260 arranged thereon, the first lower pad 231 and the second lower pad 232 are arranged on an upper surface of the first base film 210.

Referring to FIG. 7, the second base film 220 includes a first upper pad 241 arranged at a third side edge on one surface, and a second upper pad 242 arranged at a fourth side edge on one surface. At this time, the flexible circuit board 260 according to one example is arranged below the second base film 220. In order that the second base film 220 is electrically connected with the flexible circuit board 260 arranged therebelow, the first upper pad 241 and the second upper pad 242 are arranged on a lower surface of the second base film 220.

Meanwhile, the first side edge of the first base film 210 and the third side edge of the second base film 220 can face each other, the second side edge of the first base film 210 can be adjacent to the first side edge of the first base film 210, and the fourth side edge of the second base film 220 can be adjacent to the third side edge of the second base film 220. At this time, the second side edge of the first base film 210 and the fourth side edge of the second base film 220 may not face each other. That is, in the light controlling apparatus 200 according to one embodiment of the present disclosure, the pads can be provided at a plurality of side edges, for example, at least three side edges.

Referring to FIG. 5, the flexible circuit board 260 according to one embodiment of the present disclosure can include a first circuit board 260a, a second circuit board 260b, a third circuit board 260c, and a fourth circuit board 260d.

The first circuit board 260a is arranged at the first side edge of the first base film 210 and the third side edge of the second base film 220. The second circuit board 260b is extended from one end of the first circuit board 260a to the fourth side edge of the second base film 220. The third circuit board 260c is extended from the other end of the first circuit board 260a to the second side edge of the first base film 210. The fourth circuit board 260d is extended from the other end of the first circuit board 260a to a direction opposite to the third circuit board 260c.

A driving voltage line 261 (261a, 261b), a common voltage line 262 (262a, 262b) and a voltage supply unit 280 are provided in the flexible circuit board 260 according to one embodiment of the present disclosure.

The driving voltage line 261 is electrically connected with the first lower pad 231 and the second lower pad 232. In more detail, the driving voltage line 261 according to one example includes a first driving voltage line 261a, a second driving voltage line 261b, and a driving voltage bridge line 261c.

The first driving voltage line 261a can be comprised of a plurality of driving voltage lines. The first driving voltage lines 261a are extended from the voltage supply unit 280 to the first circuit board 260a and electrically connected with the first lower pad 231 through an adhesive member 2311 as shown in FIGS. 5 and 8.

The second driving voltage line 261b is extended from the voltage supply unit 280 to the third circuit board 260c and electrically connected with the second lower pad 232 through an adhesive member 2321 as shown in FIGS. 5 and 10.

At this time, in order that the second voltage driving line 261b is electrically connected with the second lower pad 232 arranged in the third circuit board 260c, the second driving voltage line 261b can be overlapped with the common voltage line 262. In this case, the flexible circuit board 260 according to one embodiment of the present disclosure includes a driving voltage bridge line 261c overlapped with the common voltage line 262 in a crossing area CS, and the second driving voltage line 261b is jumped from one side of the fourth circuit board 260d to the other side of the fourth circuit board 260d by the driving voltage bridge line 261c. Therefore, the driving voltage line 261 according to one embodiment of the present disclosure can be extended from the voltage supply unit 280 arranged in the fourth circuit board 260d to simultaneously apply a voltage to the first lower pad 231 connected with the first circuit board 260a and the second lower pad 232 connected with the third circuit board 260c.

The common voltage line 262 is electrically connected with the first upper pad 241 and the second upper pad 242. In more detail, the common voltage line 262 according to one example includes a first common voltage line 262a, a second common voltage line 262b, and a common voltage bridge line 262c.

The first common voltage line 262a can be comprised of a plurality of common voltage lines. The first common voltage lines 262a are extended from the voltage supply unit 280 to the first circuit board 260a and electrically connected with the first upper pad 241 through an adhesive member 2411 as shown in FIGS. 5 and 9.

The second common voltage line 262b is extended from the voltage supply unit 280 to the first circuit board 260a and the second circuit board 260b and electrically connected with the second upper pad 242 through an adhesive member 2421 as shown in FIGS. 5 and 11.

At this time, in order that the second common voltage line 262b is electrically connected with the second upper pad 242 arranged in the second circuit board 260b, the second common voltage line 262b can be overlapped with the driving voltage line 261. In this case, the flexible circuit board 260 according to one embodiment of the present disclosure includes a common voltage bridge line 262c overlapped with the driving voltage line 261 in a crossing area CS, and the second common voltage line 262b is jumped from one side of the fourth circuit board 260d to the other side of the fourth circuit board 260d by the common voltage bridge line 262c. Therefore, the common voltage line 262 according to one embodiment of the present disclosure can be extended from the voltage supply unit 280 arranged in the fourth circuit board 260d to simultaneously apply a voltage to the first upper pad 241 connected with the first circuit board 260a and the second upper pad 242 connected with the second circuit board 260b.

The voltage supply unit 280 is provided at one side of the fourth circuit board 260d. The voltage supply unit 280 is electrically connected with the driving voltage line 261 to supply a first voltage to the first electrode 230 through the driving voltage line 261. Also, the voltage supply unit 280 is electrically connected with the common voltage line 262 to supply a second voltage to the second electrode 240 through the common voltage line 262.

As described above, if the first voltage and the second voltage are respectively applied to the first electrode 230 and the second electrode 240, the light controlling apparatus 200 according to one embodiment of the present disclosure can be implemented as a light-shielding mode for shielding incident light or a transmissive mode for transmitting incident light due to a change in the arrangement of the liquid crystals 251a and the dichroic dyes 251b.

The flexible circuit board 260 according to one embodiment of the present disclosure described as above is attached to the pads 231, 232, 241 and 242 through the adhesive members 2311, 2321, 2411 and 2421 and electrically connected thereto. In more detail, the flexible circuit board 260 according to one embodiment of the present disclosure includes a first protective film 271, a second protective film 272, and adhesive members 2311, 2321, 2411 and 2421 as shown in FIGS. 8 to 11.

The first protective film 271 is provided on the pads 231, 232, 241 and 242 to protect the voltage lines 261 and 262. The first protective film 271 is arranged at only sides of the adhesive members 2311, 2321, 2411 and 2421 to prevent the adhesive members 2311, 2321, 2411 and 2421 from being exposed. For example, the first protective film 271 may not be provided between the adhesive members 2311, 2321, 2411 and 2421 and the pads 231, 232, 241 and 242. The second protective film 272 is provided to surround the voltage lines 261 and 262 exposed to the outside.

Since the adhesive members 2311, 2321, 2411 and 2421 have conductive balls EB therein, the voltage lines 261 and 262 can be electrically connected with the pads 231, 232, 241 and 242 through the conductive balls EB.

The pads 231, 232, 241 and 242 include the first and second lower pads 231 and 232 arranged in the first base film 210 and the first and second upper pads 241 and 242 arranged in the second base film 220.

The first lower pad 231 and the second lower pad 232 are electrically connected with the driving voltage line 261. The first lower pad 231 and the second lower pad 232 can be provided simultaneously through the same process as that of the first electrode 230, and can be made of the same material as that of the first electrode 230.

The first upper pad 241 and the second upper pad 242 are electrically connected with the common voltage line 262. The first upper pad 241 and the second upper pad 242 can be provided simultaneously through the same process as that of the second electrode 240 and can be made of the same material as that of the second electrode 240.

In the light controlling apparatus 200 according to one embodiment of the present disclosure described above, the pads are arranged on the sealant area SLA and the pad area PA, and the flexible circuit board 260 is attached to the sealant area SLA and the pad area PA. In the light controlling apparatus of the related art, since the flexible circuit board is attached to the pad area only provided at one side of the base film to supply the voltage, a problem occurs in that a voltage drop is caused by resistance if the flexible circuit board becomes far away from the pad area. To solve this problem, in the light controlling apparatus 200 according to one embodiment of the present disclosure, the pads are arranged on the sealant area SLA as well as the pad area PA.

In the light controlling apparatus 200 according to one embodiment of the present disclosure, the flexible circuit board 260 can be attached to at least three sides of the first and second base films 210 and 220 to prevent a voltage drop, whereby non-uniform characteristics can be prevented from occurring.

Also, in the light controlling apparatus 200 according to one embodiment of the present disclosure, since the flexible circuit board 260 is attached to the sealant area SLA provided with the pad, picture quality can be prevented from being deteriorated without using additional space.

Second Embodiment

Figure 12:
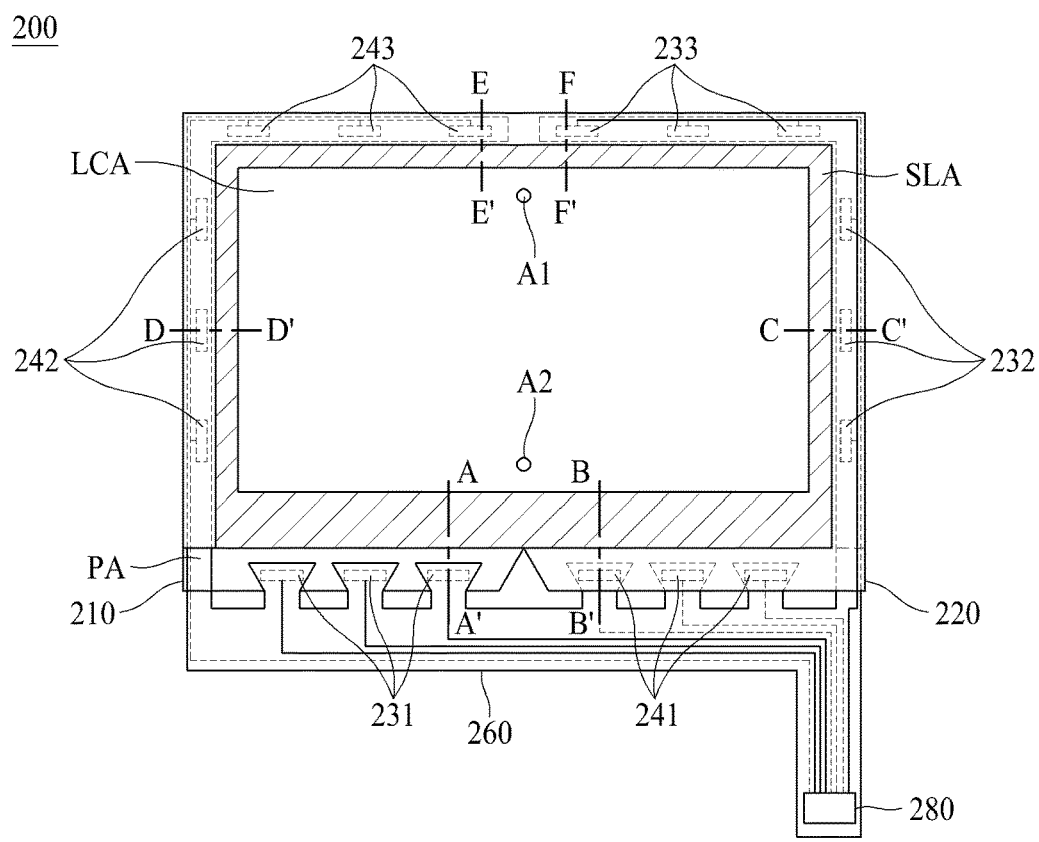
FIG. 12 is a plane view illustrating a light controlling apparatus according to a second embodiment of the present disclosure.
Figure 13:
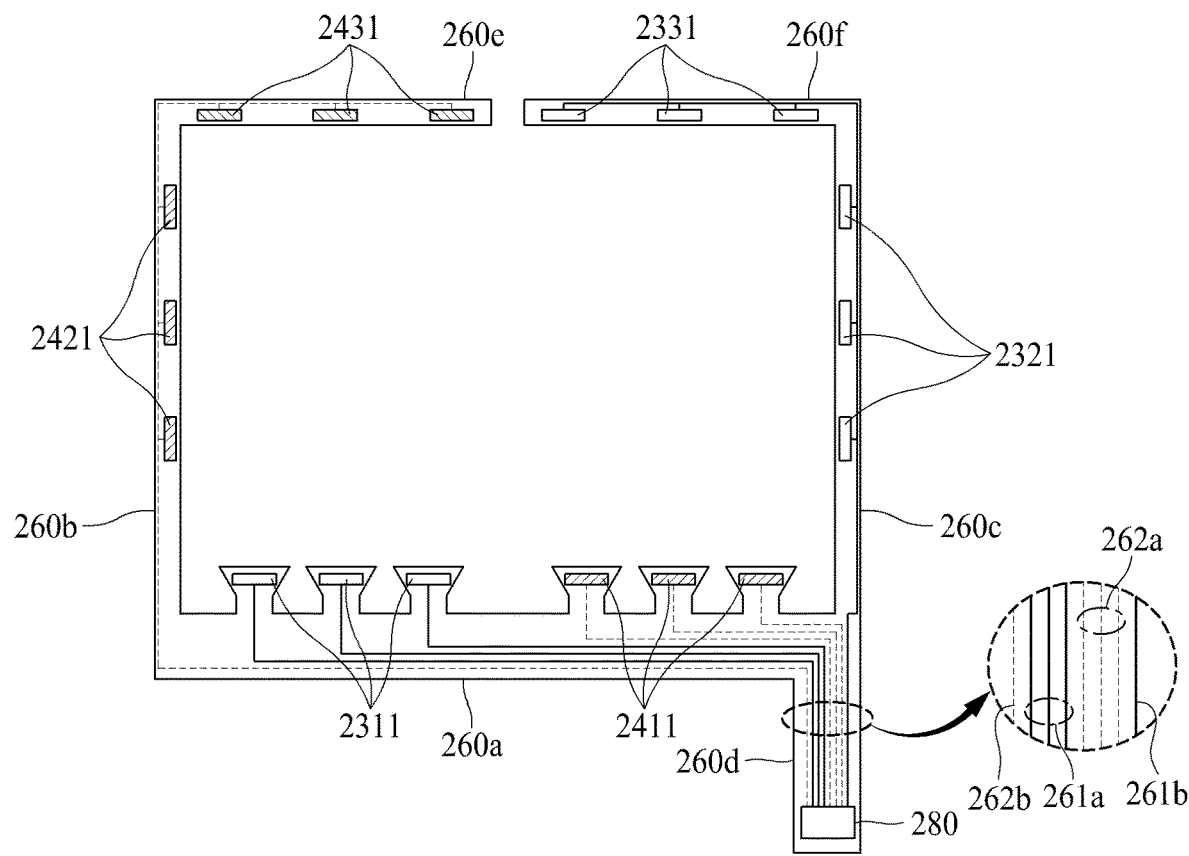
FIG. 13 is a plane view illustrating a flexible circuit board according to the second embodiment of the present disclosure.
Figure 14:
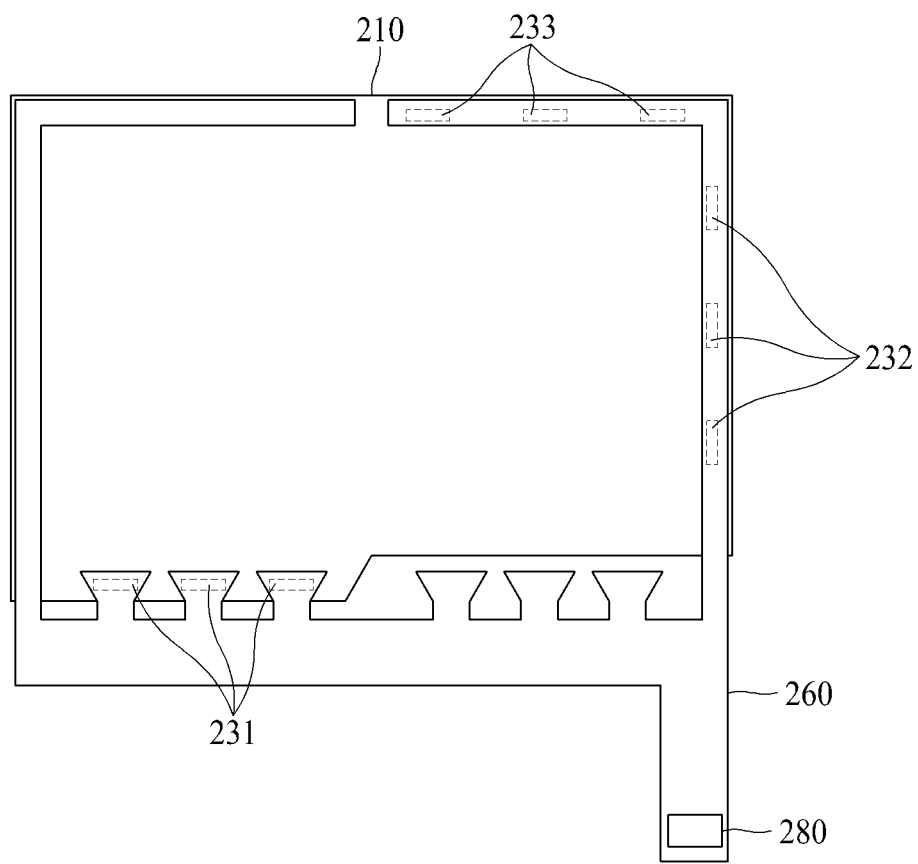
FIG. 14 is a plane view briefly illustrating a first base film and the flexible circuit board of the light controlling apparatus according to the second embodiment of the present disclosure.
Figure 15:
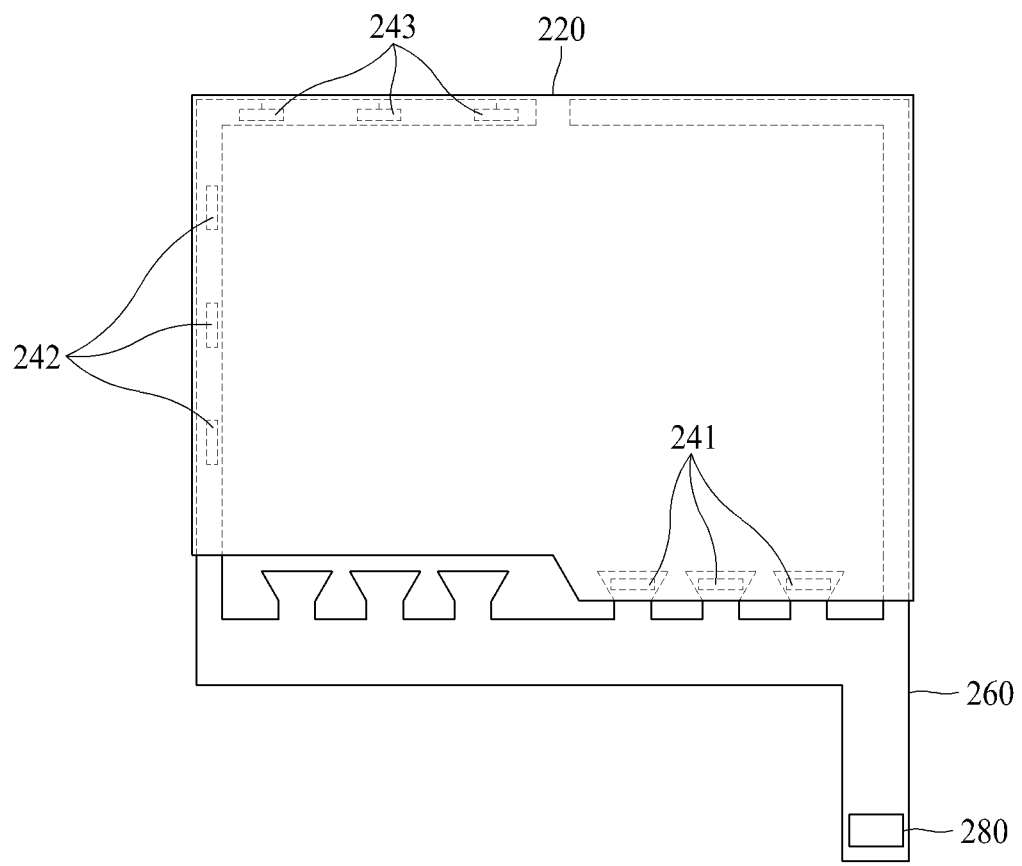
FIG. 15 is a plane view briefly illustrating a second base film and the flexible circuit board of the light controlling apparatus according to the second embodiment of the present disclosure.
Figure 16:
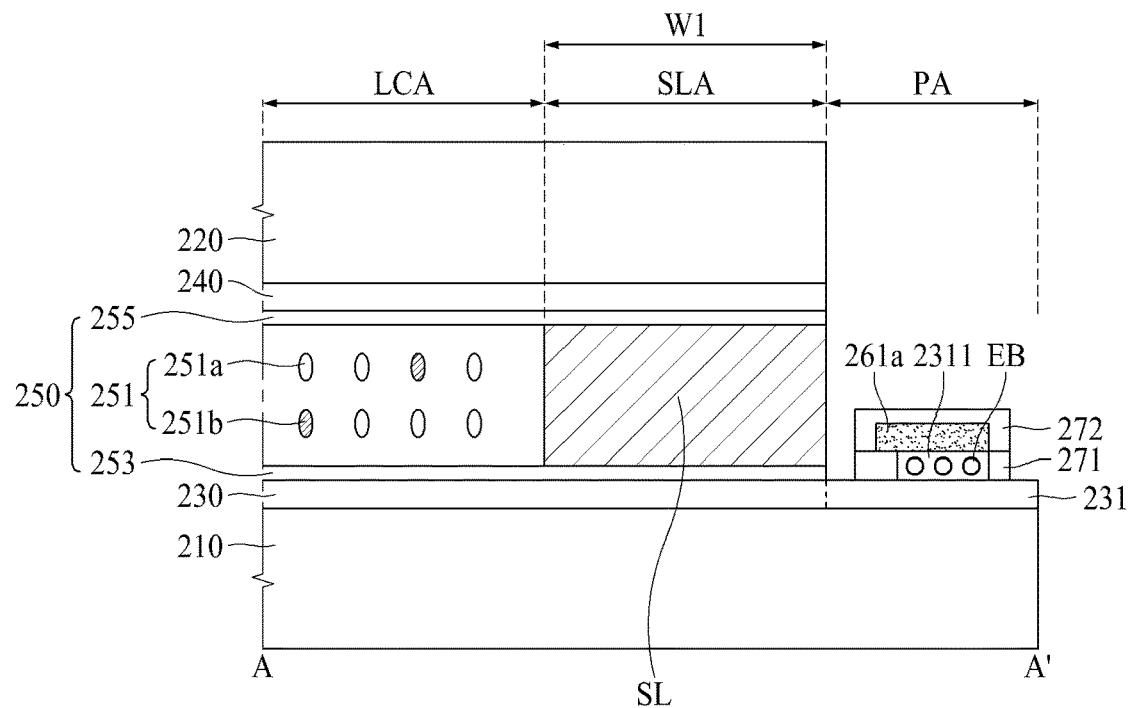
FIG. 16 is a cross-sectional view along line A-A' of FIG. 12.
Figure 17:
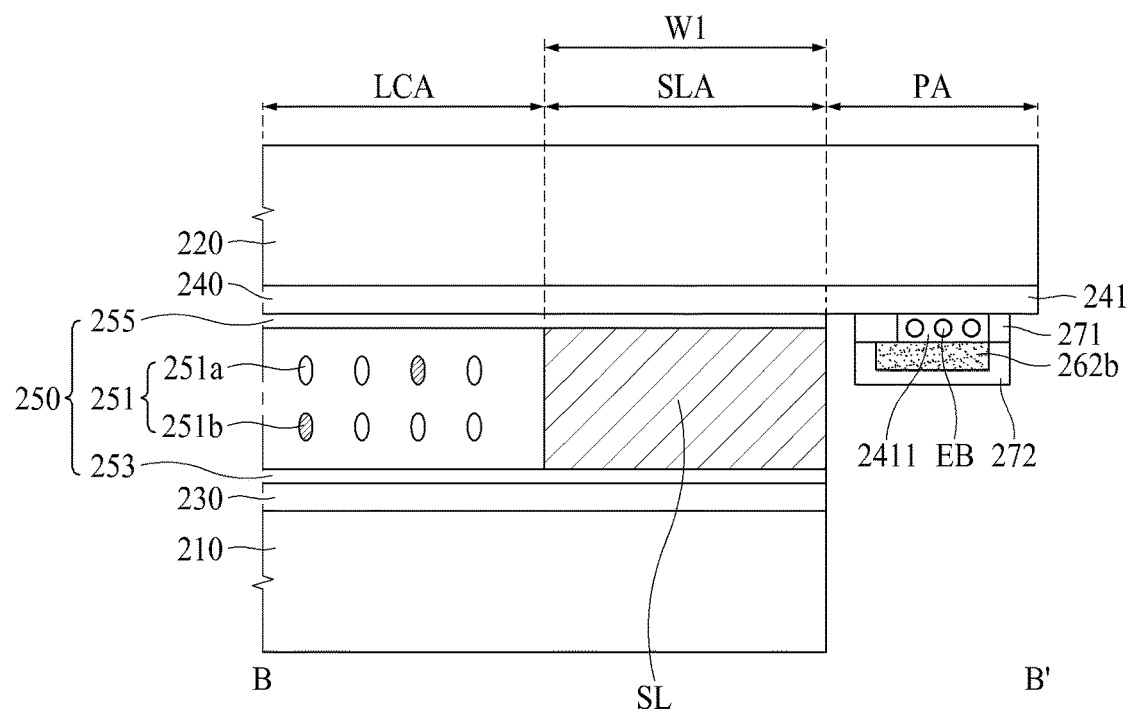
FIG. 17 is a cross-sectional view along line B-B' of FIG. 12.
Figure 18:
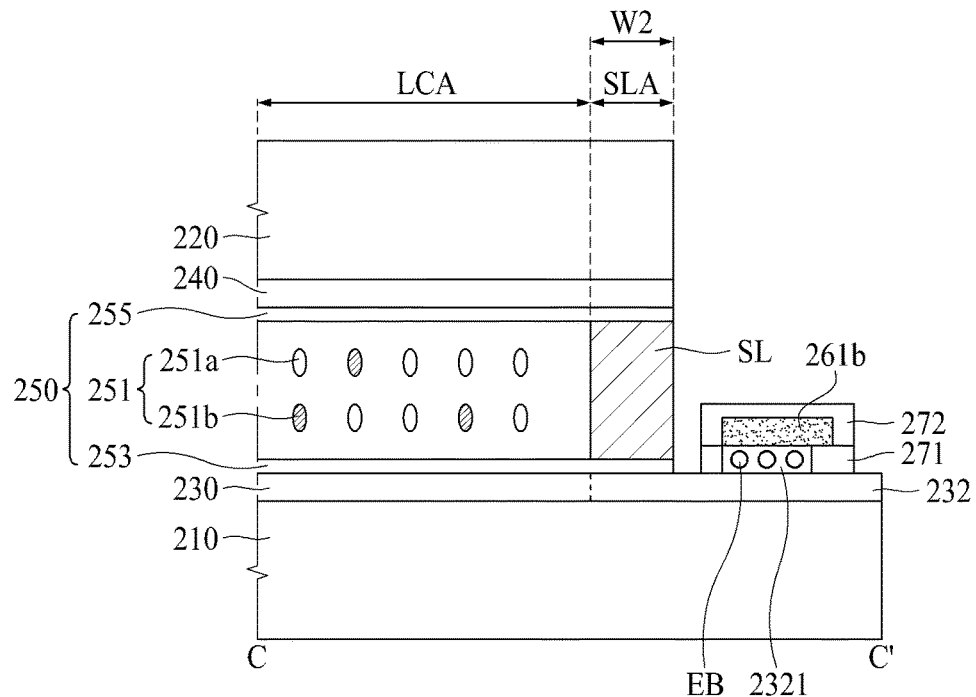
FIG. 18 is a cross-sectional view along line C-C' of FIG. 12.
Figure 19:
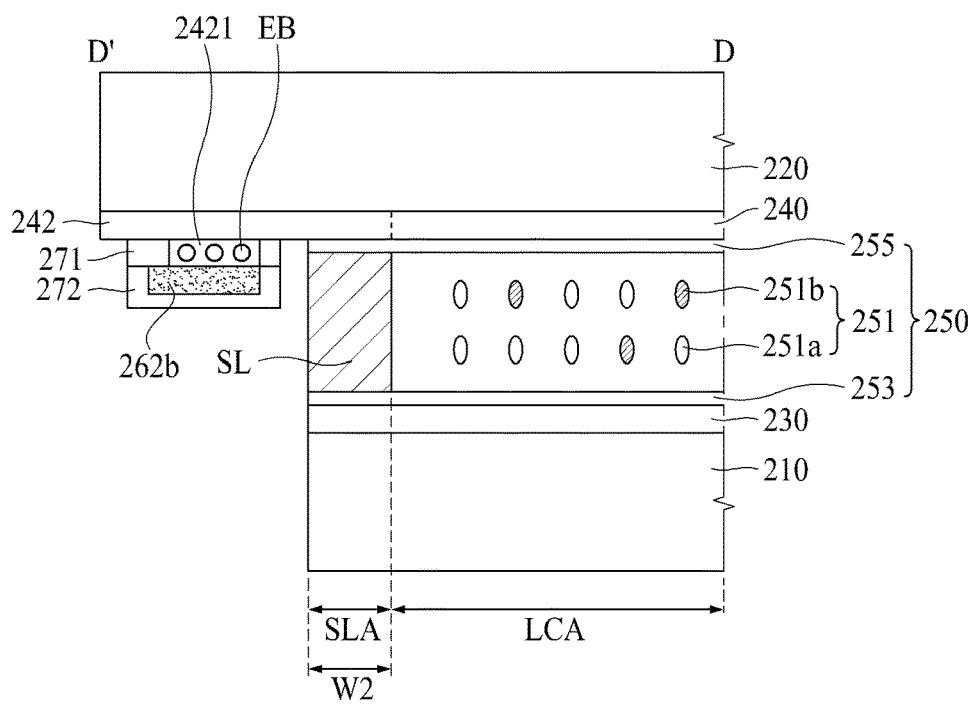
FIG. 19 is a cross-sectional view along line D-D' of FIG. 12.
Figure 20:
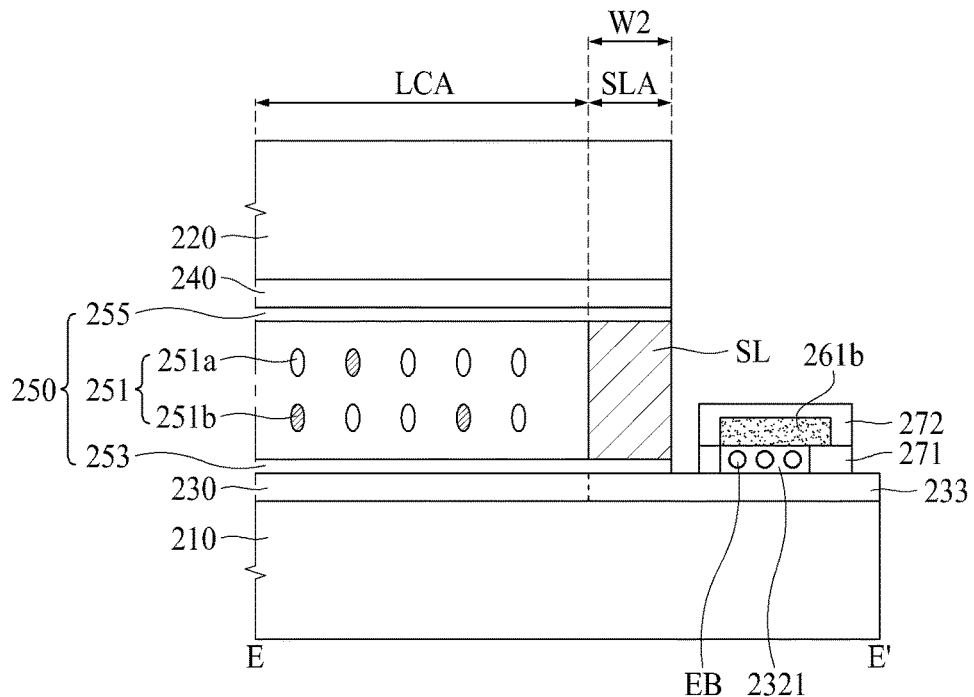
FIG. 20 is a cross-sectional view along line E-E' of FIG. 12.
Figure 21:
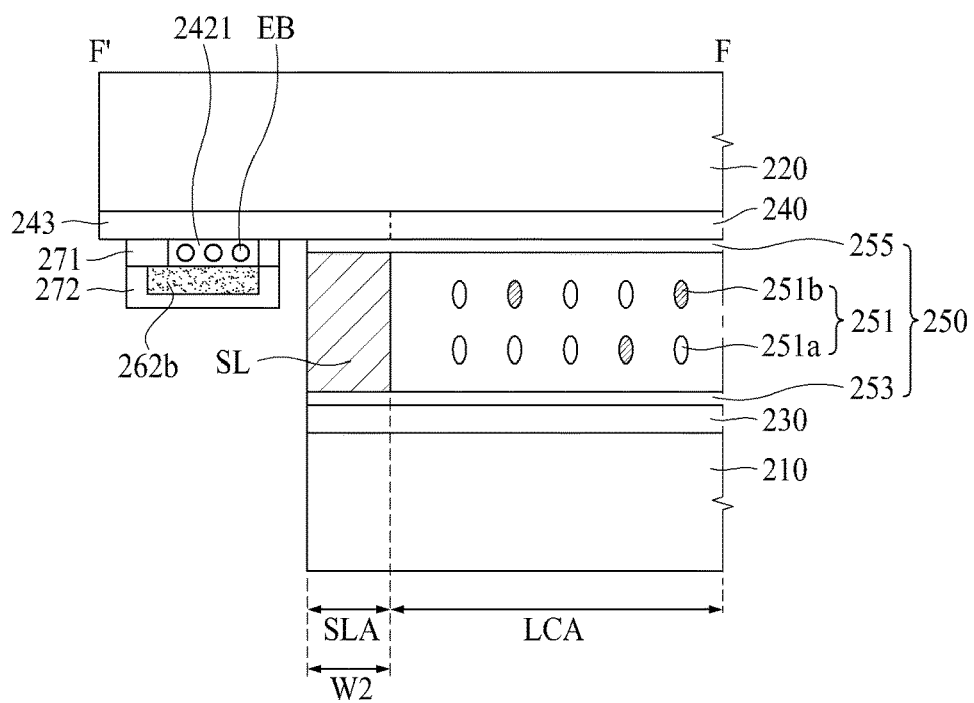
FIG. 21 is a cross-sectional view along line F-F' of FIG. 12.

FIG. 12 is a plane view illustrating a light controlling apparatus according to a second embodiment of the present disclosure. FIG. 13 is a plane view illustrating a flexible circuit board according to the second embodiment of the present disclosure. FIG. 14 is a plane view briefly illustrating a first base film and the flexible circuit board of the light controlling apparatus according to the second embodiment of the present disclosure. FIG. 15 is a plane view briefly illustrating a second base film and the flexible circuit board of the light controlling apparatus according to the second embodiment of the present disclosure. FIG. 16 is a cross-sectional view along line A-A' of FIG. 12. FIG. 17 is a cross-sectional view along line B-B' of FIG. 12. FIG. 18 is a cross-sectional view along line C-C' of FIG. 12. FIG. 19 is a cross-sectional view along line D-D' of FIG. 12. FIG. 20 is a cross-sectional view along line E-E' of FIG. 12. FIG. 21 is a cross-sectional view along line F-F' of FIG. 12.

The light controlling apparatus 200 according to the second embodiment of the present disclosure can shield incident light in a light-shielding mode, and can transmit incident light in a transmissive mode. Hereinafter, the light controlling apparatus 200 according to the second embodiment of the present disclosure will be described with reference to FIGS. 12 to 21.

Referring to FIGS. 12 to 21, the light controlling apparatus 200 according to the second embodiment of the present disclosure includes a light controlling area LCA, a sealant area SLA, and a pad area PA.

The light controlling area LCA is arranged inside the sealant area SLA. The light controlling area LCA can be provided at a position corresponding to the display area DA of FIG. 2. The light controlling area LCA according to the second embodiment of the present disclosure includes a first electrode 230, a second electrode 240 and a liquid crystal layer 250, which are arranged between a base film 210 and a second base film 220.

Since the first base film 210, the second base film 220, the first electrode 230, the second electrode 240 and the liquid crystal layer 250 according to the second embodiment of the present disclosure are substantially the same elements as those according to the first embodiment of the present disclosure, their detailed description will be omitted or will be brief.

Since the light controlling apparatus 200 according to the second embodiment of the present disclosure can implement a light-shielding mode which shields light by means of the light controlling area LCA, a bright-room contrast ratio of the transparent display device can be prevented from being deteriorated when the light controlling apparatus 200 is applied to the transparent display panel 100.

The sealant area SLA is arranged to surround the light controlling area LCA. The sealant area SLA according to one example can have a frame shape. The sealant area SLA according to the second embodiment of the present disclosure bonds the first base film 210 to the second base film 220 by means an adhesive material SL such as a sealant, which is arranged between the first base film 210 and the second base film 220. Also, the sealant area SLA according to the second embodiment of the present disclosure includes a first electrode 230 extended from the light controlling area LCA, an a second electrode 240. The sealant area SLA according to one example can include, but is not limited to, a first alignment film 253 and a second alignment film 254 as shown in FIGS. 16 to 21.

The pad area PA is arranged outside the sealant area SLA. The pad area PA can be provided on a portion where a part of an edge of each of the first base film 210 and the second base film 220 is extended and then protruded. The pad area PA includes a first lower pad 231 and a first upper pad 241.

In the light controlling apparatus 200 according to the second embodiment of the present disclosure, pads are arranged on the sealant area SLA and the pad area PA, and the flexible circuit board 260 is attached to the sealant area SLA and the pad area PA. In the light controlling apparatus of the related art, since a flexible circuit board is attached to a pad area only provided at one side of a base film to supply a voltage, a problem occurs in that a voltage drop is caused by resistance if the flexible circuit board becomes far away from the pad area. To solve this problem, in the light controlling apparatus 200 according to the second embodiment of the present disclosure, the pads are provided at several sides of the base film. Therefore, the pad area PA according to the second embodiment of the present disclosure can be arranged to surround the sealant area SLA as shown in FIG. 12.

In the light controlling apparatus 200 according to the second embodiment of the present disclosure, the flexible circuit board 260 can be attached to all of four sides of the first and second base films 210 and 220 to prevent a voltage drop, whereby non-uniform characteristics can be prevented from occurring. Also, in the light controlling apparatus 200 according to the second embodiment of the present disclosure, since the flexible circuit board 260 is attached to the sealant area SLA of which width is reduced and provided with the pad, picture quality can be prevented from being deteriorated without using additional space.

Hereinafter, the first base film 210, the second base film 220 and the flexible circuit board 260 of the light controlling apparatus 200 according to the second embodiment of the present disclosure will be described in detail.

FIG. 14 is a plane view briefly illustrating that pads 231, 232 and 233 provided in the first base film 210 are attached with the flexible circuit board 260, and FIG. 15 is a plane view briefly illustrating that pads 241, 242 and 243 provided in the second base film 220 are attached with the flexible circuit board 260.

Referring to FIG. 14, the first base film 210 includes a first lower pad 231 arranged at a first side edge on one surface, a second lower pad 232 arranged at a second side edge on one surface, and a third lower pad 233 arranged at a fifth side edge on one surface. At this time, the first lower pad 231 and the third lower pad 233 are arranged on a plane so as not to face each other. As a result, the first lower pad 231 is arranged to adjoin the first upper pad 241 and the second upper pad 242. The flexible circuit board 260 is arranged above the first base film 210. In order that the first base film 210 is electrically connected with the flexible circuit board 260, the first lower pad 231, the second lower pad 232 and the third lower pad 233 are arranged on an upper surface of the first base film 210.

Referring to FIG. 15, the second base film 220 includes a first upper pad 241 arranged at a third side edge on one surface, a second upper pad 242 arranged at a fourth side edge on one surface, and a third upper pad 243 arranged at a sixth side edge on one surface. At this time, the first upper pad 241 and the third upper pad 243 are arranged on a plane so as not to face each other. As a result, the first upper pad 241 is arranged to adjoin the first lower pad 231 and the second lower pad 232. The flexible circuit board 260 is arranged below the second base film 220. In order that the second base film 220 is electrically connected with the flexible circuit board 260, the first upper pad 241, the second upper pad 242 and the third upper pad 243 are arranged on a lower surface of the second base film 220.

Meanwhile, the first side edge of the first base film 210 and the third side edge of the second base film 220 can face each other, the second side edge of the first base film 210 can be adjacent to the first side edge of the first base film 210, and fifth side edge of the first base film 210 can be adjacent to the second side edge of the second base film 220 while facing the first side edge of the first base film 210. the fourth side edge of the second base film 220 can be adjacent to the third side edge of the second base film 220, and the sixth side edge of the second base film 210 can be adjacent to the third side edge of the second base film 220 while facing the third side edge of the third base film 220. At this time, the fifth side edge of the first base film 210 and the sixth side edge of the second base film 220 can face each other. For example, in the light controlling apparatus 200 according to the second embodiment of the present disclosure, the pads can be provided at a plurality of side edges, for example, at least four side edges.

Referring to FIG. 13, the flexible circuit board 260 according to the second embodiment of the present disclosure can include a first circuit board 260a, a second circuit board 260b, a third circuit board 260c, a fourth circuit board 260d, a fifth circuit board 260e and a sixth circuit board 260f.

The first circuit board 260a is arranged at the first side edge of the first base film 210 and the third side edge of the second base film 220. The second circuit board 260b is extended from one end of the first circuit board 260a to the fourth side edge of the second base film 220. The third circuit board 260c is extended from the other end of the first circuit board 260a to the second side edge of the first base film 210. The fourth circuit board 260d is extended from the other end of the first circuit board 260a to a direction opposite to the third circuit board 260c. The fifth circuit board 260e is extended from one end of the second circuit board 260b to the sixth side edge of the second base film 220. The sixth circuit board 260f is extended from the other end of the third circuit board 260c to the fifth side edge of the first base film 210.

A driving voltage line 261, a common voltage line 262 and a voltage supply unit 280 are provided in the flexible circuit board 260 according to the second embodiment of the present disclosure.

The driving voltage line 261 is electrically connected with the first lower pad 231, the second lower pad 232 and the third lower pad 233. In more detail, the driving voltage line 261 according to one example includes a first driving voltage line 261a and a second driving voltage line 261b.

The first driving voltage line 261a can be comprised of a plurality of driving voltage lines. The first driving voltage lines 261a are extended from the voltage supply unit 280 to the first circuit board 260a and electrically connected with the first lower pad 231 through an adhesive member 2311 as shown in FIGS. 13 and 16.

The second driving voltage line 261b is extended from the voltage supply unit 280 to the third circuit board 260c and electrically connected with the second lower pad 232 through an adhesive member 2321 as shown in FIGS. 13 and 18. Also, the second driving voltage line 261b is extended from the third circuit board 260c to the sixth circuit board 260f and electrically connected with the third lower pad 233 through an adhesive member 2331 as shown in FIGS. 13 and 20.

The number of the second driving voltage lines 261b can be provided to be smaller than the number of the first driving voltage lines 261a. As the number of the second driving voltage lines 261b is more increased, the second driving voltage lines 261b can stably supply voltages to the second lower pad 232 and the third lower pad 233. However, widths of the third circuit board 260c and the sixth circuit board 260f can have no option but to be increased to arrange a plurality of lines. In this case, a width of the sealant area SLA may be too reduced, whereby an adhesive force between the first base film 210 and the second base film 220 can be weakened. Alternatively, if the width of the sealant area SLA is maintained at a certain level, a width of a bezel area has no option but to be increased, whereby it may be difficult to implement a narrow bezel.

That is, since the third circuit board 260c and the sixth circuit board 260f have widths smaller than that of the first circuit board 260a, the number of the second driving voltage lines 261b can be smaller than that of the first driving voltage lines 261a. The number of the second driving voltage lines 261b can be selected within a range that can make sure of a minimum sealant area SLA while stably supplying voltages.

Meanwhile, the second driving voltage line 261b can be arranged to be spaced apart from the first driving voltage line 261a by interposing the first common voltage line 262a therebetween. As shown in FIG. 5, the first driving voltage line 261a and the second driving voltage line 261b can be arranged to adjoin each other. However, if the first driving voltage line 261a and the second driving voltage line 261b extended from the voltage supply unit 280 adjoin each other, since the first driving voltage line 261a should be extended to the first circuit board 260a and the second driving voltage line 261b should be extended to the third circuit board 260c and the sixth circuit board 260f, a crossing area CS overlapped with the common voltage line 262 may occur as shown in FIG. 5. Since a separate bridge line (e.g., 261c in FIG. 5) should be formed in the crossing area CS to jump the second driving voltage line 261b from one side to the other side, a manufacturing process may be complicated. Thus, the second driving voltage line 261b according the second embodiment of the present disclosure is spaced apart from the first driving voltage line 261a by interposing the first common voltage line 262a therebetween, whereby it is not required to form a separate bridge line 261c, and the manufacturing process can be simplified.

The common voltage line 262 is electrically connected with the first upper pad 241, the second upper pad 242 and the third upper pad 243. In more detail, the common voltage line 262 according to one example includes a first common voltage line 262a and a second common voltage line 262b.

The first common voltage line 262a can be comprised of a plurality of common voltage lines. The first common voltage lines 262a are extended from the voltage supply unit 280 to the first circuit board 260a and electrically connected with the first upper pad 241 through an adhesive member 2411 as shown in FIGS. 13 and 17.

The second common voltage line 262b is extended from the voltage supply unit 280 to the first circuit board 260a and the second circuit board 260b and electrically connected with the second upper pad 242 through an adhesive member 2421 as shown in FIGS. 13 and 19. Also, the second common voltage line 262b is extended from the second circuit board 260b to the fifth circuit board 260e and electrically connected with the third upper pad 243 through an adhesive member 2431 as shown in FIGS. 13 and 21.

The number of the second common voltage lines 262b can be provided to be smaller than the number of the first common voltage lines 262a. As the number of the second common voltage lines 262b is more increased, the second common voltage lines 262b can stably supply voltages to the second upper pad 242 and the third upper pad 243. However, widths of the second circuit board 260b and the fifth circuit board 260e can have no option but to be increased to arrange a plurality of lines. In this case, a width of the sealant area SLA is too reduced, whereby an adhesive force between the first base film 210 and the second base film 220 can be weakened. Alternatively, if the width of the sealant area SLA is maintained at a certain level, a width of a bezel area has no option but to be increased, whereby it is difficult to implement a narrow bezel.

That is, since the second circuit board 260b and the fifth circuit board 260e have widths smaller than that of the first circuit board 260a, the number of the second common voltage lines 262b can be smaller than that of the first common voltage lines 262a. The number of the second common voltage lines 262b can be selected within a range that can make sure of a minimum sealant area SLA while stably supplying voltages.

Meanwhile, the second common voltage line 262b can be arranged to be spaced apart from the first common voltage line 262a by interposing the first driving voltage line 261a therebetween. As shown in FIG. 5, the first common voltage line 262a and the second common voltage line 262b can be arranged to adjoin each other. However, if the first common voltage line 262a and the second common voltage line 262b extended from the voltage supply unit 280 adjoin each other, since the first common voltage line 262a should be extended to the first circuit board 260a and the second common voltage line 262b should be extended to the second circuit board 260b and the fifth circuit board 260e, a crossing area CS overlapped with the common voltage line 262 may occur as shown in FIG. 5. Since a separate bridge line 262c should be formed in the crossing area CS to jump the second common voltage line 262b from one side to the other side, a manufacturing process may be complicated. Thus the second common voltage line 262b according to the second embodiment of the present disclosure is spaced apart from the first common voltage line 262a by interposing the first driving voltage line 261a therebetween, whereby it is not required to form a separate bridge line 262c, and the manufacturing process can be simplified.

The voltage supply unit 280 is provided at one side of the fourth circuit board 260d. The voltage supply unit 280 is electrically connected with the driving voltage line 261 to supply a first voltage to the first electrode 230 through the driving voltage line 261. Also, the voltage supply unit 280 is electrically connected with the common voltage line 262 to supply a second voltage to the second electrode 240 through the common voltage line 262.

As described above, if the first voltage and the second voltage are respectively applied to the first electrode 230 and the second electrode 240, the light controlling apparatus 200 according to the embodiment of the present disclosure can be implemented as a light-shielding mode for shielding incident light or a transmissive mode for transmitting incident light due to a change in arrangement of the liquid crystals 251a and the dichroic dyes 251b.

The flexible circuit board 260 according to the embodiment of the present disclosure described as above is attached to the pads 231, 232, 233, 241, 242 and 243 through the adhesive members 2311, 2321, 2331, 2411, 2421 and 2431 and electrically connected thereto. In more detail, the flexible circuit board 260 according to the second embodiment of the present disclosure includes a first protective film 271, a second protective film 272, and adhesive members 2311, 2321, 2331, 2411, 2421 and 2431 as shown in FIGS. 16 to 21.

The first protective film 271 is provided on the pads 231, 232, 233, 241, 242 and 243 to protect the voltage lines 261 and 262. The first protective film 271 is arranged at only sides of the adhesive members 2311, 2321, 2331, 2411, 2421 and 2431 to prevent the adhesive members 2311, 2321, 2331, 2411, 2421 and 2431 from being exposed. That is, the first protective film 271 is not provided between the adhesive members 2311, 2321, 2331, 2411, 2421 and 2431 and the pads 231, 232, 233, 241, 242 and 243. The second protective film 272 is provided to surround the voltage lines 261 and 262 exposed to the outside.

Since the adhesive members 2311, 2321, 2331, 2411, 2421 and 2431 have conductive balls EB therein, the voltage lines 261 and 262 can electrically be connected with the pads 231, 232, 233, 241, 242 and 243 through the conductive balls EB.

The pads 231, 232, 233, 241, 242 and 243 include the first, second and third lower pads 231, 232 and 233 arranged in the first base film 210 and the first, second and third upper pads 241, 242 and 243 arranged in the second base film 220.

The first lower pad 231, the second lower pad 232 and the third lower pad 233 are electrically connected with the driving voltage line 261. The first lower pad 231, the second lower pad 232 and the third upper pad 243 can be provided simultaneously through the same process as that of the first electrode 230, and can be made of the same material as that of the first electrode 230.

The first upper pad 241, the second upper pad 242 and the third upper pad 243 are electrically connected with the common voltage line 262. The first upper pad 241, the second upper pad 242 and the third upper pad 243 can be provided simultaneously through the same process as that of the second electrode 240, and can be made of the same material as that of the second electrode 240.

In the light controlling apparatus 200 according to the second embodiment of the present disclosure described above, the pads are arranged on the pad area PA provided to surround the sealant area SLA, and the flexible circuit board 260 is attached to the pad area PA. In the light controlling apparatus of the related art, since the flexible circuit board is attached to the pad area provided at only one side of the base film to supply the voltage, a problem occurs in that a voltage drop is caused by resistance if the flexible circuit board becomes far away from the pad area. To solve this problem, in the light controlling apparatus 200 according to the second embodiment of the present disclosure, the pads are arranged on the pad area PA to surround the sealant area SLA at four sides.

In the light controlling apparatus 200 according to the second embodiment of the present disclosure, the flexible circuit board 260 can be attached to four sides of the first and second base films 210 and 220 to prevent a voltage drop, whereby non-uniform characteristics can be prevented from occurring.

Also, the sealant area SLA according to the second embodiment of the present disclosure is different from the sealant area SLA according to the first embodiment of the present disclosure in that it does not include a second lower pad 232, a third lower pad 233, a second upper pad 242 and a third upper pad 243. In more detail, the sealant area SLA according to the first embodiment of the present disclosure has a uniform width to surround the light controlling area LCA, and the second lower pad 232 and the second upper pad 242 are arranged in the sealant area SLA. On the other hand, the sealant area SLA according to the second embodiment of the present disclosure has a width which is not uniform. Specifically, the sealant area SLA has a first width W1 at one side where the first circuit board 260a is arranged, and has a second width W2 smaller than the first width W1 at the other sides where the second to sixth circuit boards 260b, 260c, 260d, 260e and 260f are arranged. Therefore, in the light controlling apparatus 200 according to the second embodiment of the present disclosure, the width of the sealant area SLA is reduced from the first width W1 to the second width W2, the second lower pad 232, the third lower pad 233, the second upper pad 242 and the third upper pad 243 can be arranged in the space where the first width W1 is reduced to the second width W2. As a result, in the light controlling apparatus 200 according to the second embodiment of the present disclosure, since the pad is provided by reducing the width of the sealant area SLA and the flexible circuit board 260 is attached to the pad, picture quality can be prevented from being deteriorated without using additional space.

Figure 23:
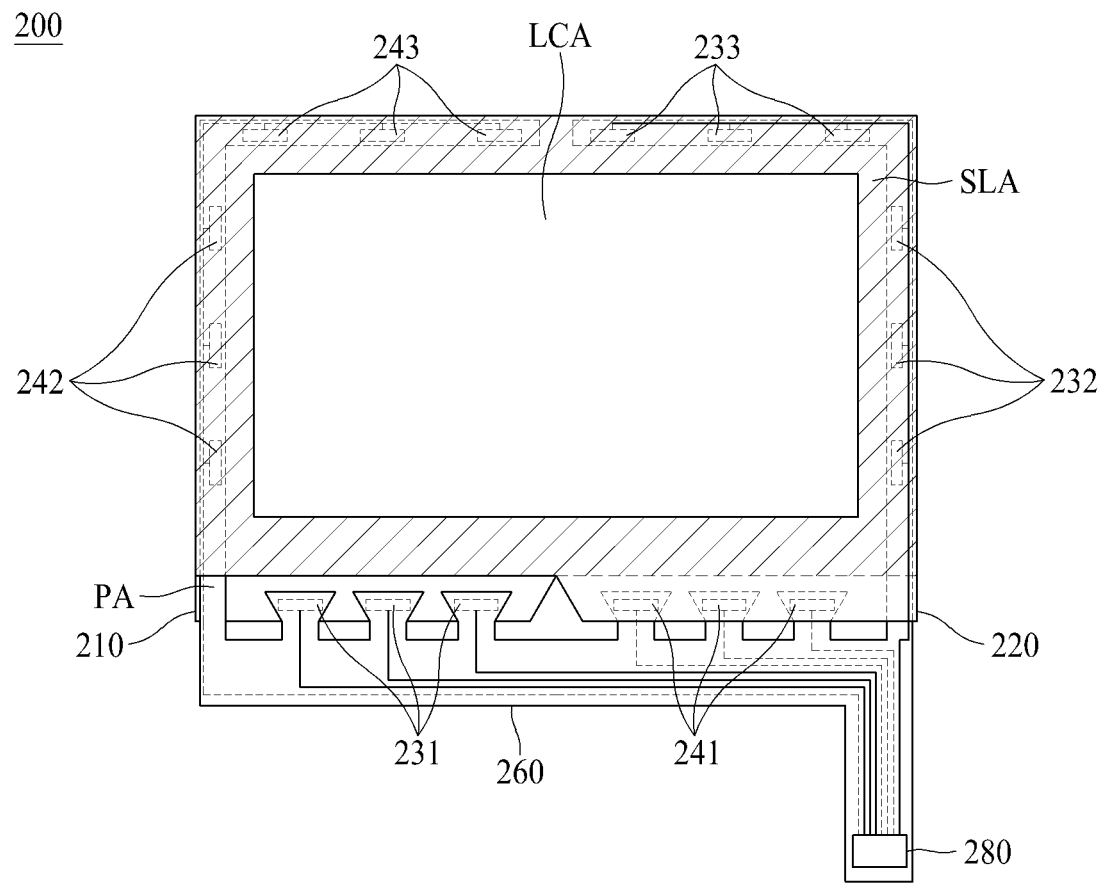
FIG. 23 is a plane view illustrating a light controlling apparatus according to a modified embodiment of FIG. 12.

Meanwhile, in the light controlling apparatus 200 according to the second embodiment of the present disclosure, the width of the sealant area SLA is reduced from the first width W1 to the second width W2, the second lower pad 232, the third lower pad 233, the second upper pad 242 and the third upper pad 243 are arranged in the space where the first width W1 is reduced to the second width W2. However, the present disclosure is not limited to this embodiment. In the light controlling apparatus 200 according to still another embodiment of the present disclosure, the second lower pad 232, the third lower pad 233, the second upper pad 242 and the third upper pad 243 can be arranged in the sealant area SLA as shown in FIG. 23.

Figure 22:
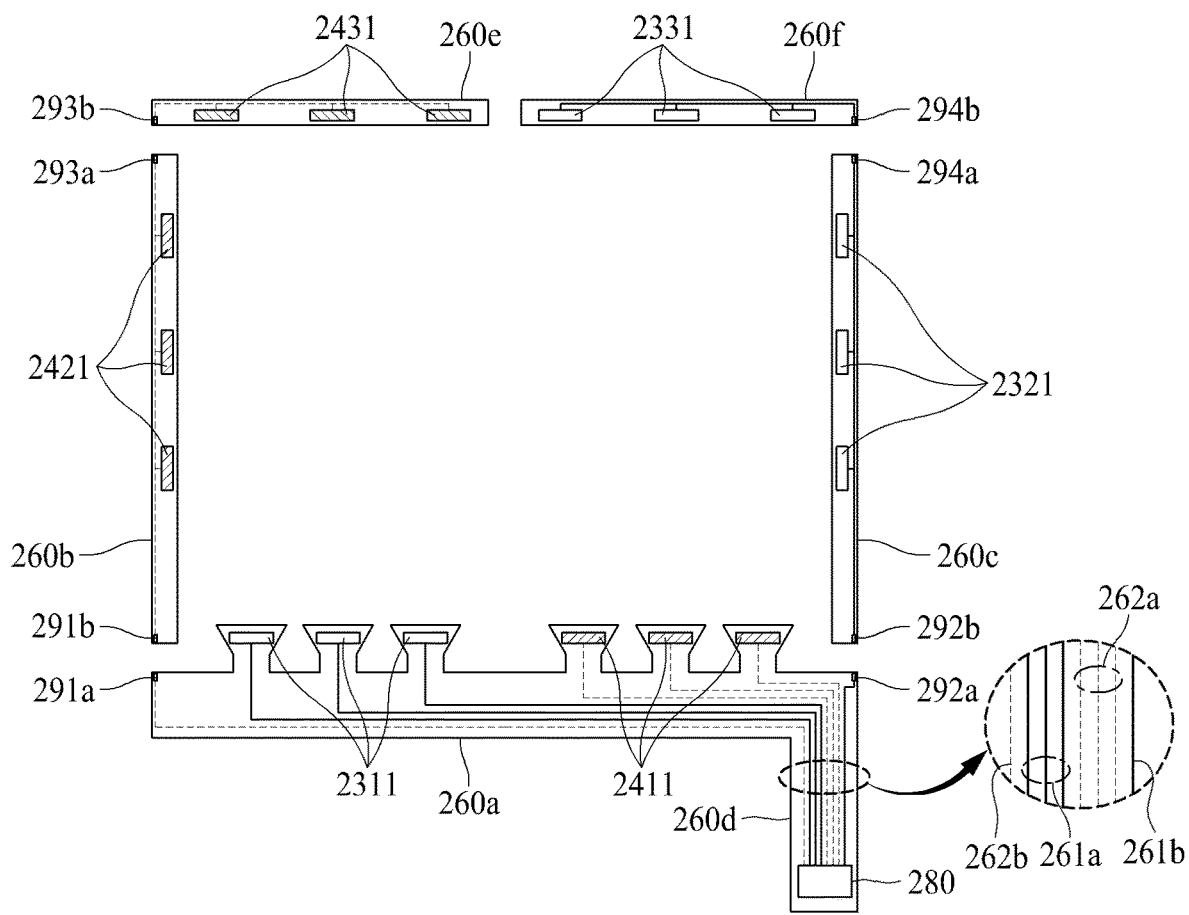
FIG. 22 is a plane view illustrating a flexible circuit board according to a modified embodiment of FIG. 13.

Meanwhile, in the flexible circuit board 260 according to the second embodiment of the present disclosure, the first circuit board 260a, the second circuit board 260b, the third circuit board 260c, the fourth circuit board 260d, the fifth circuit board 260e and the sixth circuit board 260f are formed in, but not limited to, a single body as shown in FIG. 13. In the flexible circuit board 260 according to still another embodiment of the present disclosure, each of the first circuit board 260a, the second circuit board 260b, the third circuit board 260c, the fourth circuit board 260d, the fifth circuit board 260e and the sixth circuit board 260f can be provided separately as shown in FIG. 22. In this case, each of the first circuit board 260a, the second circuit board 260b, the third circuit board 260c, the fourth circuit board 260d, the fifth circuit board 260e and the sixth circuit board 260f can include a separate connector to be electrically connected with its adjacent circuit board.

In detail, for example as shown in FIG. 22, the first circuit board 260a can be provided with a first connector 291a at one side which adjoins the second circuit board 260b, and the second circuit board 260b can be provided with a first connector 291b at one side which adjoins the first circuit board 260a. The first connector 291a of the first circuit board 260a can be connected to the first connector 291b of the second circuit board 260b, whereby the second common voltage line 262b of the first circuit board 260a can electrically be connected with the second common voltage line 262b of the second circuit board 260b.

Also, the first circuit board 260a can be provided with a second connector 292a at one side which adjoins the third circuit board 260c, and the third circuit board 260c can be provided with a second connector 292b at one side which adjoins the first circuit board 260a. The first connector 291a of the first circuit board 260a can be connected to the second connector 292b of the third circuit board 260c, whereby the second driving voltage line 261b of the first circuit board 260a can electrically be connected with the second driving voltage line 261b of the third circuit board 260c.

Also, the second circuit board 260b can be provided with a third connector 293a at one side which adjoins the second circuit board 260b, and the fifth circuit board 260e can be provided with a third connector 293b at one side which adjoins the second circuit board 260b. The third connector 293a of the second circuit board 260b can be connected to the third connector 293b of the fifth circuit board 260e, whereby the second common voltage line 262b of the second circuit board 260b can electrically be connected with the second common voltage line 262b of the fifth circuit board 260e.

Also, the third circuit board 260c can be provided with a fourth connector 294a at one side which adjoins the sixth circuit board 260c, and the sixth circuit board 260f can be provided with a fourth connector 294b at one side which adjoins the third circuit board 260c. The fourth connector 294a of the third circuit board 260c can be connected to the fourth connector 294b of the sixth circuit board 260f, whereby the second driving voltage line 261b of the third circuit board 260c can electrically be connected with the second driving voltage line 261b of the sixth circuit board 260f.

Each of the first circuit board 260a, the second circuit board 260b, the third circuit board 260c, the fifth circuit board 260e and the sixth circuit board 260f of the flexible circuit board 260 shown in FIG. 22 is provided separately. However, the present disclosure is not limited to the flexible circuit board shown in FIG. 22. At least one of the first circuit board 260a, the second circuit board 260b, the third circuit board 260c, the fifth circuit board 260e and the sixth circuit board 260f of the flexible circuit board 260 according to still another embodiment of the present disclosure can be provided separately. For example, the first circuit board 260a and the fourth circuit board 260d can be provided in a single body, the second circuit board 260b and the fifth circuit board 260e can be provided in a single body, and the third circuit board 260c and the sixth circuit board 260f can be provided in a single body.

Each of the first circuit board 260a, the second circuit board 260b, the third circuit board 260c, the fifth circuit board 260e and the sixth circuit board 260f of the flexible circuit board 260 according to further still another embodiment of the present disclosure can include a plurality of circuit boards.

In comparison with the light controlling apparatus of the related art in which a circuit board for supplying a power source is arranged at only one side, in the light controlling apparatus 200 according to the first and second embodiments of the present disclosure, a voltage drop can be prevented from occurring, whereby non-uniform light characteristics can be prevented from occurring as will be shown from Table 1 below.

TABLE 1

| Experimental example | Measured position | Transmittance | Haze |
|---|---|---|---|
| 1 (Related art) | Area A1 | 38.2 | 85.7 |
|  | Area A2 | 34.1 | 92.2 |
| 2 | Area A1 | 36.7 | 90 |
|  | Area A2 | 33.8 | 92.4 |
| 3 | Area A1 | 32.6 | 91.2 |
|  | Area A2 | 32.2 | 92.5 |
| 4 | Area A1 | 29.2 | 93.9 |
|  | Area A2 | 29.3 | 94.4 |

The experimental example 1 indicates the light controlling apparatus of the related art, and the experimental example 2 indicates the light controlling apparatus according to the first embodiment of the present disclosure. The experimental example 4 indicates the light controlling apparatus according to the second embodiment of the present disclosure, and the experimental example 3 indicates the light controlling apparatus which is the same as that according to the second embodiment of the present disclosure except that the first upper pad 241 and the third upper pad 243 are arranged to face each other on a plane and the first lower pad 231 and the third lower pad 233 are arranged to face each other on a plane according to another example of the present disclosure.

Referring to Table 1, the light controlling apparatus of the related art indicates transmittance of 38.2 in the area A1 and transmittance of 34.1 in the area A2. Also, the light controlling apparatus of the related art indicates haze of 85.7 in the area A1 and haze of 92.2 in the area A2. As a result, a difference of 4.1 in transmittance between the area A1 and the area A2 and a difference of 6.5 in haze between the area A1 and the area A2 occur in the light controlling apparatus of the related art, whereby non-uniform light characteristics occur significantly.

On the other hand, the light controlling apparatus according to the experimental example 2 indicates transmittance of 36.7 in the area A1 and transmittance of 33.8 in the area A2. Also, the light controlling apparatus according to the experimental example 2 indicates haze of 90 in the area A1 and haze of 92.4 in the area A2. As a result, a difference of 2.9 in transmittance between the area A1 and the area A2 and a difference of 2.4 in haze between the area A1 and the area A2 occur in the light controlling apparatus according to the experimental example 2, whereby it is noted from the light controlling apparatus according to the experimental example 2 that non-uniform light characteristics such as transmittance and haze can be improved in comparison with the light controlling apparatus of the related art.

Also, the light controlling apparatus according to the experimental example 3 indicates transmittance of 32.6 in the area A1 and transmittance of 32.2 in the area A2. Also, the light controlling apparatus according to the experimental example 3 indicates haze of 91.2 in the area A1 and haze of 92.5 in the area A2. As a result, a difference of 0.4 in transmittance between the area A1 and the area A2 and a difference of 1.3 in haze between the area A1 and the area A2 occur in the light controlling apparatus according to the experimental example 3, whereby it is noted from the light controlling apparatus according to the experimental example 3 that non-uniform light characteristics such as transmittance and haze can be improved in comparison with the light controlling apparatus of the related art.

Also, the light controlling apparatus according to the experimental example 4 indicates transmittance of 29.2 in the area A1 and transmittance of 29.3 in the area A2. Also, the light controlling apparatus according to the experimental example 4 indicates haze of 93.9 in the area A1 and haze of 94.4 in the area A2. As a result, a difference of 0.1 in transmittance between the area A1 and the area A2 and a difference of 0.5 in haze between the area A1 and the area A2 occur in the light controlling apparatus according to the experimental example 4, whereby it is noted from the light controlling apparatus according to the experimental example 4 that non-uniform light characteristics such as transmittance and haze can be improved in comparison with the light controlling apparatus of the related art.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A light controlling apparatus comprising:
   a first base film including a first lower pad arranged at a first side edge on one surface of the first base film and a second lower pad arranged at a second side edge on the one surface of the first base film;
   a second base film including a first upper pad arranged at a third side edge on one surface of the second base film and a second upper pad arranged at a fourth side edge on the lower surface of the second base film, the one surface of the first base film facing the one surface of the second base film; and
   a flexible circuit board including driving voltage lines electrically connected with the first and second lower pads and common voltage lines electrically connected with the first and second upper pads,
   wherein the flexible circuit board includes:

a first circuit board arranged at the first side edge of the first base film;

a second circuit board extended from one end of the first circuit board to the fourth side edge of the second base film; and a third circuit board extended from the other end of the first circuit board to the second side edge of the first base film.

2. The light controlling apparatus of claim 1, further comprising:

a light controlling area in which liquid crystals are arranged between the first base film and the second base film; and a sealant area in which an adhesive material is arranged to surround the light controlling area, wherein the second lower pad and the second upper pad are arranged in the sealant area.

3. The light controlling apparatus of claim 2, wherein the first lower pad and the first upper pad are arranged outside the sealant area.

4. The light controlling apparatus of claim 1, wherein the first side edge of the first base film and the third side edge of the second base film face each other, the second side edge of the first base film and the first side edge of the first base film are adjacent to each other, and the fourth side edge of the second base film is adjacent to the third side edge of the second base film.

5. The light controlling apparatus of claim 1, wherein the flexible circuit board further includes a fourth circuit board extended from the other end of the first circuit board to a direction opposite to the third circuit board.

6. The light controlling apparatus of claim 5, further comprising:

a voltage supply unit provided at one side of the fourth circuit board, and configured to supply a first voltage to the driving voltage lines and supply a second voltage to the common voltage lines.

7. The light controlling apparatus of claim 1, wherein the driving voltage lines include first driving voltage lines and second driving voltage lines, the first driving voltage lines are electrically connected with the first lower pad, and the second driving voltage lines are electrically connected with the second lower pad.

8. The light controlling apparatus of claim 1, wherein the common voltage lines include first common voltage lines and second common voltage lines, the first common voltage lines are electrically connected with the first upper pad, and the second common voltage lines are electrically connected with the second upper pad.

9. The light controlling apparatus of claim 6, wherein the driving voltage lines include first driving voltage lines electrically connected with the first lower pad, second driving voltage lines electrically connected with the second lower pad, and driving voltage bridge lines overlapped with the common voltage lines, and the second driving voltage lines are extended from the voltage supply unit to the third circuit board and jumped from one side of the fourth circuit board to another side of the fourth circuit board by the driving voltage bridge lines.

10. The light controlling apparatus of claim 6, wherein the common voltage lines include first common voltage lines electrically connected with the first upper pad, second common voltage lines electrically connected with the second upper pad, and common voltage bridge lines overlapped with the driving voltage lines, and the second common voltage lines are extended from the voltage supply unit to the first circuit board and the second circuit board and jumped from one side of the fourth circuit board to another side of the fourth circuit board by the common voltage bridge lines.

11. The light controlling apparatus of claim 1, further comprising:

a light controlling area in which liquid crystals are arranged between the first base film and the second base film;

a sealant area in which an adhesive material is arranged to surround the light controlling area; and a pad area surrounding the sealant area.

12. The light controlling apparatus of claim 1, wherein the first base film further includes a third lower pad arranged at a fifth side edge on the one surface of the first base film, and the second base film further includes a third upper pad arranged at a sixth side edge on the one surface of the second base film.

13. The light controlling apparatus of claim 12, wherein the first lower pad, the second lower pad, the third lower pad, the first upper pad, the second upper pad and the third upper pad are arranged outside a sealant area.

14. The light controlling apparatus of claim 13, wherein the sealant area arranged adjacent to the second lower pad, the third lower pad, the second upper pad and the third upper pad has a width smaller than that of the sealant area arranged adjacent to the first lower pad and the first upper pad.

15. The light controlling apparatus of claim 12, wherein the first side edge of the first base film and the third side edge of the second base film face each other, the second side edge of the first base film is adjacent to the first side edge of the first base film, the fifth side edge of the first base film is adjacent to the second side edge of the first base film while facing the first side edge of the first base film, the fourth side edge of the second base film is adjacent to the third side edge of the second base film, and the sixth side edge of the second base film is adjacent to the second side edge of the second base film while facing the third side edge of the second base film.

16. The light controlling apparatus of claim 12, wherein the first lower pad is arranged to adjoin the first upper pad and the second upper pad, and the first upper pad is arranged to adjoin the first lower pad and the second lower pad.

17. The light controlling apparatus of claim 12, wherein the flexible circuit board further includes:

a fourth circuit board extended from one end of the first circuit board;

a fifth circuit board arranged at the sixth side edge of the second base film; and a sixth circuit board arranged at the fifth side edge of the first base film.

18. The light controlling apparatus of claim 17, wherein at least one of the first to sixth circuit boards includes a connector and is electrically connected with its adjacent circuit board through the connector.

19. The light controlling apparatus of claim 12, wherein the driving voltage lines include first driving voltage lines and second driving voltage lines, the first driving voltage lines are electrically connected with the first lower pad, and the second driving voltage lines are electrically connected with the second lower pad and the third lower pad.

20. The light controlling apparatus of claim 19, wherein the number of the second driving voltage lines is smaller than the number of the first driving voltage lines.

21. The light controlling apparatus of claim 12, wherein the common voltage lines include first common voltage lines and second common voltage lines,
- the first common voltage lines are electrically connected with the first upper pad, and
- the second common voltage lines are electrically connected with the second upper pad and the third lower pad.

22. The light controlling apparatus of claim 21, wherein the number of the second common voltage lines is smaller than the number of the first common voltage lines.

23. A transparent display device comprising:
- a transparent display panel including a transmissive area and an emission area, and provided with pixels for displaying an image in the emission area; and
- the light controlling apparatus arranged on one surface of the transparent display panel and recited in claim 1.

* * * * *